US012283280B2

(12) United States Patent
Zhang et al.

(10) Patent No.: US 12,283,280 B2
(45) Date of Patent: Apr. 22, 2025

(54) DATA SEQUENCE GENERATION

(71) Applicant: Telefonaktiebolaget LM Ericsson (publ), Stockholm (SE)

(72) Inventors: Mengqiu Zhang, Stockholm (SE); Erlendur Karlsson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 757 days.

(21) Appl. No.: 17/388,549

(22) Filed: Jul. 29, 2021

(65) Prior Publication Data

US 2021/0358507 A1 Nov. 18, 2021

Related U.S. Application Data

(63) Continuation of application No. PCT/EP2020/079042, filed on Oct. 15, 2020.
(Continued)

(51) Int. Cl.
*G10L 19/02* (2013.01)
*G10L 19/26* (2013.01)
(Continued)

(52) U.S. Cl.
CPC .............. *G10L 19/02* (2013.01); *G10L 19/26* (2013.01); *G10L 21/0232* (2013.01); *H04R 3/04* (2013.01);
(Continued)

(58) Field of Classification Search
CPC ..... G10L 19/02; G10L 19/26; G10L 21/0232; H04S 3/008; H04S 7/303; H04S 2400/01; H04S 2420/01; H04S 1/00; H04R 3/04
(Continued)

(56) References Cited

U.S. PATENT DOCUMENTS

| | | | | |
|---|---|---|---|---|
| 2006/0177078 A1* | 8/2006 | Chanda | | H04S 1/005 381/17 |
| 2009/0161912 A1 | 6/2009 | Yatom et al. | | |

(Continued)

OTHER PUBLICATIONS

De Boor, Carl, "B(asic)-Spline Basics", United States Army under Contract No. DAAL03-87-K-0030 (Feb. 2014) (34 pages).

(Continued)

*Primary Examiner* — Xu Mei
(74) *Attorney, Agent, or Firm* — Rothwell, Figg, Ernst & Manbeck P.C.

(57) ABSTRACT

A method for audio signal filtering. The method includes generating a pair of filters for a certain location specified by an elevation angle $\vartheta$ and an azimuth angle $\varphi$, the pair of filters consisting of a right filter ($\hat{h}^r(\vartheta, \varphi)$) and a left filter ($\hat{h}^l(\vartheta, \varphi)$); filtering an audio signal using the right filter; and filtering the audio signal using the left filter. Generating the pair of filters comprises: i) obtaining at least a first set of elevation basis function values at the elevation angle; ii) obtaining at least a first set of azimuth basis function values at the azimuth angle; iii) generating the right filter using: a) at least the first set of elevation basis function values, b) at least the first set of azimuth basis function values, and c) right filter model parameters; and iv) generating the left filter using: a) at least the first set of elevation basis function values, b) at least the first set of azimuth basis function values, and c) left filter model parameters.

25 Claims, 23 Drawing Sheets

Related U.S. Application Data

(60) Provisional application No. 62/915,992, filed on Oct. 16, 2019.

(51) Int. Cl.
*G10L 21/0232* (2013.01)
*H04R 3/04* (2006.01)
*H04S 3/00* (2006.01)
*H04S 7/00* (2006.01)

(52) U.S. Cl.
CPC .............. *H04S 3/008* (2013.01); *H04S 7/303* (2013.01); *H04S 2400/01* (2013.01); *H04S 2420/01* (2013.01)

(58) Field of Classification Search
USPC ..................................... 381/1, 17, 18, 56, 58
See application file for complete search history.

(56) References Cited

U.S. PATENT DOCUMENTS

2012/0207310 A1* 8/2012 Kirkeby .................. H04S 5/005 381/17
2016/0044430 A1* 2/2016 McGrath ................. H04S 3/002 381/1
2019/0215637 A1 7/2019 Lee et al.
2022/0360931 A1* 11/2022 Namba ................... H04S 7/304

OTHER PUBLICATIONS

"SOFA (Spatially Oriented Format for Acoustics)", https://www.sofaconventions.org/mediawiki/index.php/SOFA, downloaded Sep. 30, 2020, (2 pages).
International Search Report and Written Opinion issued in International Application No. PCT/EP2020/079042 dated Jan. 28, 2021 (14 pages).
Torres, Julio C. B. et al., "HRTF Interpolation in the Wavelet Transform Domain" 2009 IEEE Workshop on Applications of Signal Processing to Audio and Acoustics, Oct. 2009 (4 pages).
Carlile, S. et al., "Continuous Virtual Auditory Space Using HRTF Interpolation: Acoustic & Psychophysical Errors", International Symposium on Multimedia Information Processing, Dec. 2000 (4 pages).
Kistler, Doris J. et al.,"A model of head-related transfer functions based on principal components analysis and minimum-phase reconstruction", Journal of the Acoustical Society of America, 91(3): 1637-1647, Mar. 1992.
Freeland, Fábio P. et al., "Interpolation of Head-Related Transfer Functions (HRTFS): A multi-source approach," in 12th European Signal Processing Conference, pp. 1761-1764, Vienna, Sep. 2004.
Zhang, Mengqiu et al., "Empirical determination of frequency representation in spherical harmonics-based HRTF functional modeling", IEEE/ACM Transactions on Audio, Speech, and Language Processing, vol. 23 (2), pp. 351-360, Feb. 2015.
Ben-Hur, Zamir et al., "Loudness stability of binaural sound with spherical harmonic representation of sparse head-related transfer functions", Eurasip Journal on Audio, Speech, and Music Processing 2019: 5, 2019 (14 pages).
Non-Final Office Action in U.S. Appl. No. 17/768,680, notification date Jan. 3, 2024 (10 pages).

* cited by examiner

DATA SEQUENCE GENERATION

TECHNICAL FIELD

This application is a continuation of International patent application no. PCT/EP2020/079042, filed on Oct. 15, 2020, which claims priority to U.S. provisional application No. 62/915,992, filed on Oct. 16, 2019. The above identified applications are incorporated by this reference.

TECHNICAL FIELD

This disclosure relates, in some embodiments, to rendering spatial audio.

BACKGROUND

We are equipped with two ears that capture sound waves propagating towards us. FIG. 1 illustrates a sound wave propagating towards a listener from a direction of arrival (DOA) specified by a pair of elevation and azimuth angles in the spherical coordinate system. On the propagation path towards us each sound wave interacts with our upper torso, head, outer ears, and the surrounding matter before reaching our left and right ear drums. This interaction results in temporal and spectral changes of the waveforms reaching the left and right eardrums, some of which are DOA dependent. Our auditory system has learned to interpret these changes to infer various spatial characteristics of the sound wave itself as well as the acoustic environment in which the listener finds himself/herself. This capability is called spatial hearing, which concerns how we evaluate spatial cues embedded in the binaural signal (i.e., the sound signals in the right and the left ear canals) to infer the location of an auditory event elicited by a sound event (a physical sound source) and acoustic characteristics caused by the physical environment (e.g. small room, tiled bathroom, auditorium, cave) we are in. This human capability, spatial hearing, can in turn be exploited to create a spatial audio scene by reintroducing the spatial cues in the binaural signal that would lead to a spatial perception of a sound.

The main spatial cues include 1) angular-related cues: binaural cues, i.e., the interaural level difference (ILD) and the interaural time difference (ITD), and monaural (or spectral) cues; 2) distance-related cues: intensity and direct-to-reverberant (D/R) energy ratio. FIG. 2 illustrates an example of ITD and spectral cues of a sound wave propagating towards a listener. The two plots illustrate the magnitude responses of a pair of HR filters obtained at an elevation of 0 degrees and an azimuth of 40 degrees (The data is from CIPIC database: subject-ID 28. The database is publicly available, which can be access from the URL www.ece.ucdavis.edu/cipic/spatial-sound/hrtf-data/). In FIGS. 1 and 2 the convention of the positive azimuth direction being to the right is used, and this is also the convention used in the remainder of this text. Some HR filter sets do, however, use another convention, where the positive azimuth direction is to the left. A mathematical representation of the short time DOA dependent temporal and spectral changes (1-5 msec) of the waveform are the so-called head-related (HR) filters. The frequency domain (FD) representations of those filters are the so-called head-related transfer functions (HRTFs) and the time domain (TD) representations are the head-related impulse responses (HRIRs). An HR filter based binaural rendering approach has been gradually established, where a spatial audio scene is generated by directly filtering audio source signals with a pair of HR filters of desired locations. This approach is particularly attractive for many emerging applications, e.g., virtual reality (VR), augmented reality (AR), mixed reality (MR), or extended reality (XR), and mobile communication systems, where headsets are commonly used.

Head-Related (HR) filters are often estimated from measurements as the impulse response of a linear dynamic system that transforms the original sound signal (input signal) into the left and right ear signals (output signals) that can be measured inside the ear channels of a listening subject at a predefined set of elevation and azimuth angles on a spherical surface of constant radius from a listening subject (e.g., an artificial head, a manikin or human subjects). The estimated HR filters are often provided as FIR filters and can be used directly in that format. To achieve an efficient binaural rendering, a pair of HRTFs may be converted to Interaural Transfer Function (ITF) or modified ITF to prevent abrupt spectral peaks. Alternatively, HRTFs may be described by a parametric representation. Such parameterized HRTFs are easy to be integrated with parametric multichannel audio coders, e.g., MPEG surround and Spatial Audio Object Coding (SAOC).

Rendering a spatial audio signal to provide a convincing spatial perception of a sound at an arbitrary location in space requires a pair of HR filters at the corresponding location, and therefore, a set of HR filters at finely sampled locations on a 2D sphere is needed. Minimum audible angle (MAA) characterizes the sensitivity of our auditory system to an angular displacement of a sound event. Regarding localization in azimuth, MAA was reported to be the smallest in the front and back (about 1 degree), and much greater for lateral sound sources (about 10 degrees) for a broadband noise burst. MAA in the median plane increases with elevation. As small as 4 degrees of MAA on average in elevation was reported with broadband noise bursts. Currently, there are some publicly available HR filter databases densely sampled in space, e.g., SADIE database, CIPIC database. However, none of them completely fulfills the MAA requirement, particularly samples in elevation. Even though SAIDE datasets of the artificial head Neumann KU100 and the KEMAR mannequin contain more than 8000 measurements, its sampling resolution in elevation between −15 degrees to 15 degrees is 15 degrees while 4 degrees is required according to the MAA studies. Inevitably, an angular interpolation of HR filters is needed so that a sound source can be rendered at locations where no actual filters have been measured. FIG. 3 shows an example of sampling grid on a 2D sphere, where the dots indicate the locations where HR filters are measured.

A number of different interpolation schemes have been developed for angular interpolation of HR filters. In general, M pairs of HR filters, $\{\hat{h}^{r/l}(\vartheta_m, \varphi_m)\text{: } m=1, \ldots, M\}$, are estimated from measurements at $(\vartheta_m, \varphi_m)$ on a sphere, where r denotes the right ear, l denotes the left ear, $\vartheta$ denotes elevation, $\varphi$ denotes azimuth. The task is to find a function $F(\vartheta, \varphi)$ where $F^{r/l}(\vartheta_m, \varphi_m)=\hat{h}^{r/l}(\vartheta_m, \varphi_m)$, which at non-sampled angles provides left and right filters that deliver audio rendering with good perceptual accuracy. Once $F(\vartheta, \varphi)$ is obtained, the left and the right ear HR filters can be generated at any arbitrary location specified by $(\vartheta, \varphi)$. Note that the superscript l or r is sometimes omitted for simplicity without confusion.

Here are two main approaches for HRTF angular interpolation:

(1) Local neighborhood approach: A commonly adopted approach is linear interpolation where a missing HRTF is inferred by weighting the contributions of measured HRTFs at its nearest surrounding positions. HRTFs may be preprocessed before interpolation, e.g., the measured HRTFs at two or more nearest locations are first converted to minimum phase and then a linear interpolation is applied.

(2) Variational approach: A more sophisticated data-driven approach is to linearly transform measured HRTFs into another space defined by a set of basis functions, where one set of basis functions covers the elevation and azimuth angle dimensions and another set covers the frequency dimension. The basis functions can be obtained by eigen-decomposition of the covariance matrix of measured HRTFs [1, 2]. In [3] spherical harmonics (SHs), which is complete and orthogonal on a 2D sphere, have been used to cover the elevation and azimuth angle dimensions and complex exponential functions have been used to cover the frequency dimension. The SH-based HRTF model yielded an encouraging level of performance in terms of average mean squared error (MSE) of the model and perceived loudness stability [4].

SUMMARY

The ability to precisely and efficiently render the spatial position of a sound source is one of the key features of an HR filter based spatial audio renderer. The spatial resolution of HR filter sets used in the renderer determines the spatial resolution of rendered sound sources. Using HR filter sets that are coarsely sampled over a 2D sphere, a VR/AR/MR/XR user usually reports spatial discontinuity of a moving sound. Such spatial discontinuities lead to audio-video sync errors that significantly decrease the sense of immersion. Using HR filter sets that are finely sampled over the sphere is one solution. However, estimating HR filter sets from input-output measurements on a fine grid that meets the MAA requirement can be very time consuming and tedious for both subjects and experimenters. Alternatively, it is more efficient to infer spatial-related information about missing HR filters given a sparsely sampled HR filter dataset.

The nearest-neighbor HR filter interpolation method assumes that HR filters at each sampled location influences an area only up to a certain finite distance. HR filters at unsampled locations are then approximated as a weighted average of HR filters at locations within a certain cut-off distance, or from a given number of the closest points on a rectilinear 2D grid, e.g., $\hat{h}(\vartheta, \varphi)=F(\vartheta, \varphi)$: $=\Sigma_{m'=1}^{M'}\omega_m h_{m'}(\vartheta_{m'}, \varphi_{m'})$, where $\hat{h}(\vartheta, \varphi)$ is the estimated HR filter vector at the unsampled location $(\vartheta, \varphi)$ and $\{h_{m'}(\vartheta_{m'}, \varphi_{m'})$: $m'=1, \ldots, M'\} \subset \{h_m(\vartheta, \varphi)$: $m=1, \ldots, M\}$. This method is simple, and the computational complexity is low, which can lead to an efficient implementation. However, the interpolation accuracy may not be enough to produce a convincing spatial audio scene. This is simply due to the fact that the variation of conditions between sample points is more complex than a weighted average of filters can produce.

The variational approach represents HR filters as a linear combination of a set of basis functions, i.e., $\hat{h}(\vartheta, \varphi)=\Sigma_{p=1}^{P}\omega_p \mathcal{B}_p(\vartheta, \varphi)$, where $\omega_p$ is the coefficient of the p-th basis function $\mathcal{B}_p(\vartheta, \varphi)$. Regardless what the basis functions are, the coefficients are usually least squares estimates obtained by minimizing the sum of squared estimation errors over a set of measured points $\{(\vartheta_m, \varphi_m)$: $m=1, \ldots, M\}$, i.e., $$\omega = \underset{\omega}{\operatorname{argmin}}\left(\Sigma_m \left\| h(\vartheta_m, \varphi_m) - \hat{h}(\vartheta_m, \varphi_m)\right\|^2\right).$$

Given a set of basis functions, the coefficients are considered to be the 'best' fit in the sense of solving the quadratic minimization problem. In principle, there is no restriction on the choice of basis functions. However, in reality, it is practical to choose a set of basis functions that is able to represent HR filter sets effectively in terms of estimation accuracy and efficiently in terms of the number of basis functions and the complexity of the basis functions.

An early work on modeling the HRTF magnitude response used principal components (PCs) as the basis functions, where the PCs were obtained by eigen-decomposition of the covariance matrix of the HRTF magnitude responses measured from 10 listeners at 265 source locations. With only five PCs, the resulting model accounts for approximately 90% of the variance in the original database. This model is efficient. It represents the original dataset well while there is no mechanism to interpolate HRTFs at missing locations. Recently, a hybrid method was proposed which combines principal component analysis (PCA) with nearest-neighbor method where the model coefficients are approximated by partial derivatives. However, the hybrid method achieves only similar results as the nearest-neighbor-based bilinear interpolation.

The SHs have been used to model the angular dependencies of HRTF sets. The resulting model yielded an encouraging level of performance in terms of the average mean squared error (MSE) of the model. However, unlike the basis functions in the eigen-decomposition-based model, which are fixed PC vectors, the SH basis functions are complex and costly to evaluate. An SH function of degree p and order q is written as $$Y_p^q(\vartheta, \varphi) = \sqrt{\frac{(2p+1)(p-q)!}{4\pi(p+q)!}}\,\wp_p^q(\cos\vartheta)e^{iq\varphi},\ -p \le q \le p.\ \wp_p^q(\cos\vartheta)$$

is an associated Legendre polynomial, which is essentially a P-th degree trigonometric polynomial. For the entire model, $(P+1)^2$ SHs of order up to P need to be evaluated.

In order to achieve a high spatial resolution, the order of the SH representation should be as high as possible. The effect of SH order on spatial aliasing has been investigated in the context of perceived spatial loudness stability, which is defined as how stable the loudness of the rendered audio scene is perceived over different head orientations. The subjective results show that a high-order (P>10) SH HRTF representation is required to facilitate high-quality dynamic virtual audio scenes. This results in $L(P+1)^2=15488$ coefficients, where L=128 corresponds to the number of frequency bins. Another study further modelled the HRTF frequency-portion with complex exponentials, and the total number of coefficients is $L(P+1)^2$, where L is the truncation number of the frequency-portion representation. Results show that in order to represent HRTFs over the entire frequency range up to 20 kHz in terms of MSE, the order of SH needs to go as high as P=30 and the truncation of the frequency-portion is L=40. The number of coefficients is 38440. Evaluating an HRTF using such a high order SH HRTF model is basically impossible to do in a real-time VR/AR/MR/XR system.

This disclosure provides a process to generate HR filters at any arbitrary locations in space that is accurate and efficient enough for a real-time VR/AR/MR/XR system. In one embodiment, a variational approach is adopted where the spatial variation of the HR filter set is modeled with B-Spline basis functions and the filter is parameterized either as a time-domain FIR filter or some mapping of that in the frequency domain, where the DFT is one such mapping. The resulting model is accurate in terms of the MSE measure and the perceptual evaluation. It is efficient in terms of the total number of basis functions and the computational effort required to evaluate an HR filter from the model is much lower than that of models using spherical harmonics or other such complex basis functions.

Accordingly, in one aspect there is provided a method for audio signal filtering. The method includes generating a pair of filters for a certain location specified by an elevation angle $\vartheta$ and an azimuth angle $\varphi$, the pair of filters consisting of a right filter ($\hat{h}^r(\vartheta, \varphi)$) and a left filter ($\hat{h}^l(\vartheta, \varphi)$). The method also includes filtering an audio signal using the right filter and filtering the audio signal using the left filter. Generating the pair of filters comprises: i) obtaining at least a first set of elevation basis function values at the elevation angle; ii) obtaining at least a first set of azimuth basis function values at the azimuth angle; iii) generating the right filter using: a) at least the first set of elevation basis function values, b) at least the first set of azimuth basis function values, and c) right filter model parameters; and iv) generating the left filter using: a) at least the first set of elevation basis function values, b) at least the first set of azimuth basis function values, and c) left filter model parameters.

In another aspect there is provided a filtering apparatus for audio signal filtering. The filtering apparatus being adapted to perform a method that includes generating a pair of filters for a certain location specified by an elevation angle $\vartheta$ and an azimuth angle $\varphi$, the pair of filters consisting of a right filter ($\hat{h}^r(\vartheta, \varphi)$) and a left filter ($\hat{h}^l(\vartheta, \varphi)$). The method also includes filtering an audio signal using the right filter and filtering the audio signal using the left filter. Generating the pair of filters comprises: i) obtaining at least a first set of elevation basis function values at the elevation angle; ii) obtaining at least a first set of azimuth basis function values at the azimuth angle; iii) generating the right filter using: a) at least the first set of elevation basis function values, b) at least the first set of azimuth basis function values, and c) right filter model parameters; and iv) generating the left filter using: a) at least the first set of elevation basis function values, b) at least the first set of azimuth basis function values, and c) left filter model parameters.

In another aspect there is provided a method for generating a data sequence at an elevation angle $\vartheta$ and an azimuth angle $\varphi$. The method includes obtaining a first set of azimuth basis function values for the azimuth angle, wherein obtaining the first set of azimuth basis function values comprises: for each azimuth basis function included in a first set of azimuth basis functions, evaluating the azimuth basis function at the azimuth angle to produce an azimuth basis function value corresponding to the azimuth angle and the azimuth basis function, and further wherein each of the azimuth basis functions included in the first set of azimuth basis functions is a periodic basis function. The method also includes using the first set of azimuth basis function values to generate the data sequence at the elevation angle and azimuth angle.

In another aspect there is provided a method for generating a model for modeling a set of data sequences sampled over a set of elevation angles and azimuth angles. The method includes specifying an azimuth basis function, where the azimuth basis function is a periodic basis function. The method also includes determining a set of model parameters for the model using the azimuth basis function.

Main advantages of the proposed processes include: a) more accurate than bilinear PC-based solutions, b) more efficient than SH-based solutions, c) building the model does not require a densely sampled HR filter database, and d) the model takes significantly less space in memory than the original HR filter database. The above advantages make the proposed embodiments attractive for real-time VR/AR/MR/XR systems.

BRIEF DESCRIPTION OF THE DRAWINGS

The accompanying drawings, which are incorporated herein and form part of the specification, illustrate various embodiments

DETAILED DESCRIPTION

Figure 4:
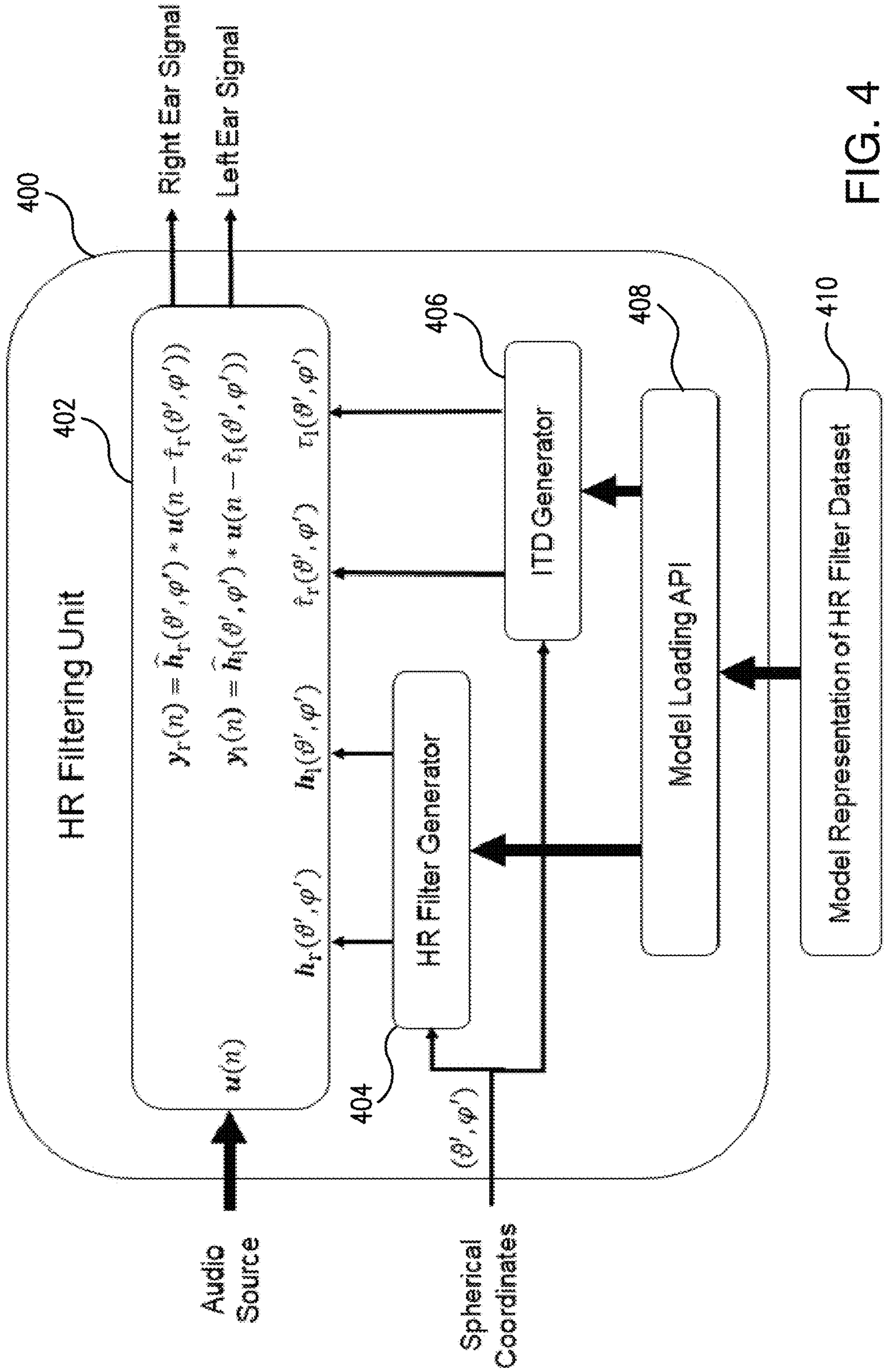
FIG. 4 illustrates a HR filtering unit according to an embodiment.

FIG. 4 illustrates a HR filtering unit 400 according to an embodiment. HR filtering unit 400 includes a rendering unit 402. Unit 400 also includes an HR filter generator 404 and an ITD generator 406 for generating HR filters and the ITD, respectively, at any elevation and azimuth angle requested by the rendering unit 402 in real time. This entails efficient evaluation of a left and right pair of HR filters from an HR filter model that has been loaded into the unit 400. This entails also efficient evaluation of the ITD from an ITD model that has been loaded into the unit. This HR Filtering Unit 400 will, therefore, have an interface 408 to load HR filter models and ITD models from a database 410 of such models. The database of HR filter models is generated off-line by estimating HR filter models of different HR filter databases.

1. HR Filter Set Modeling

Figure 1:
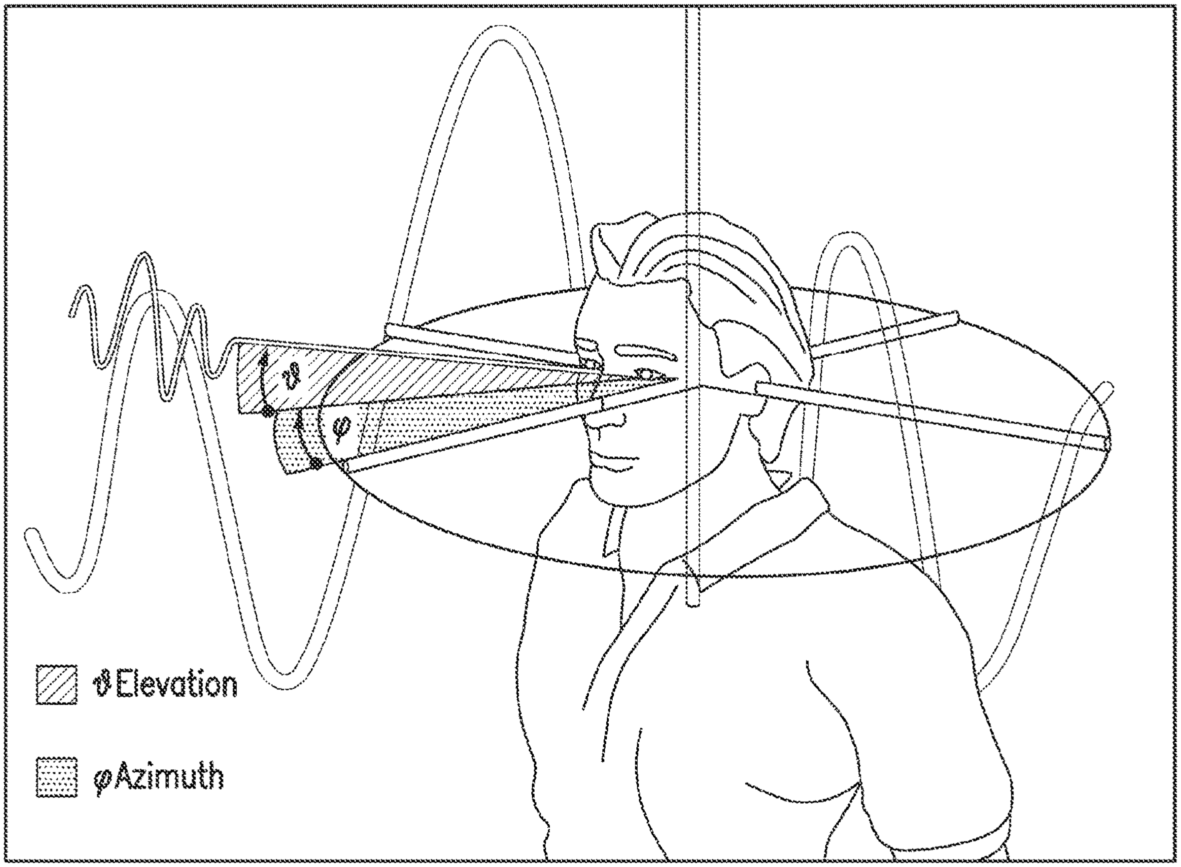
FIG. 1 illustrates a sound wave propagating towards a listener from a direction of arrival (DOA) specified by a pair of elevation and azimuth angles in the spherical coordinate system.
Figure 2:
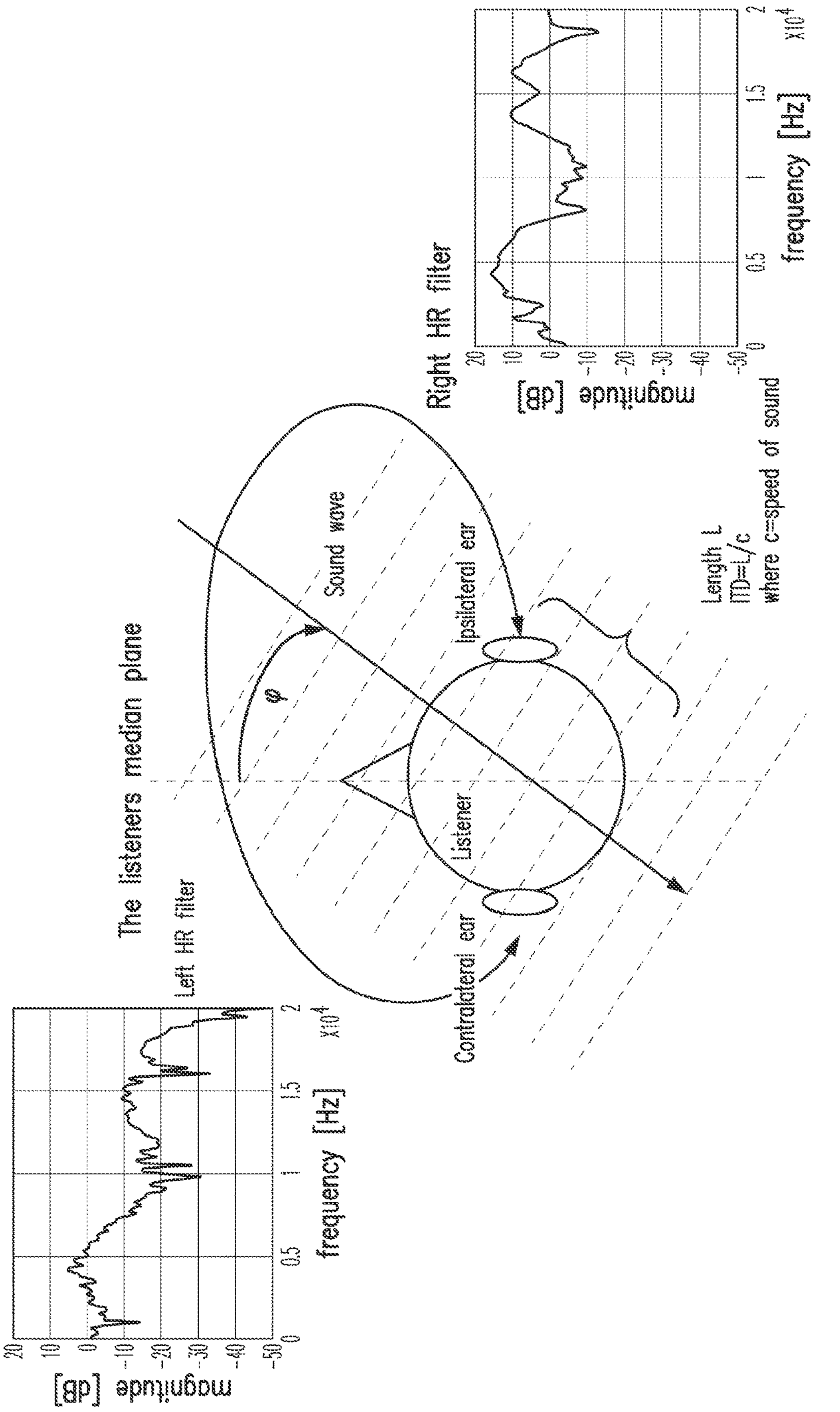
FIG. 2 illustrates an example of ITD and spectral cues of a sound wave propagating towards a listener.
Figure 3:
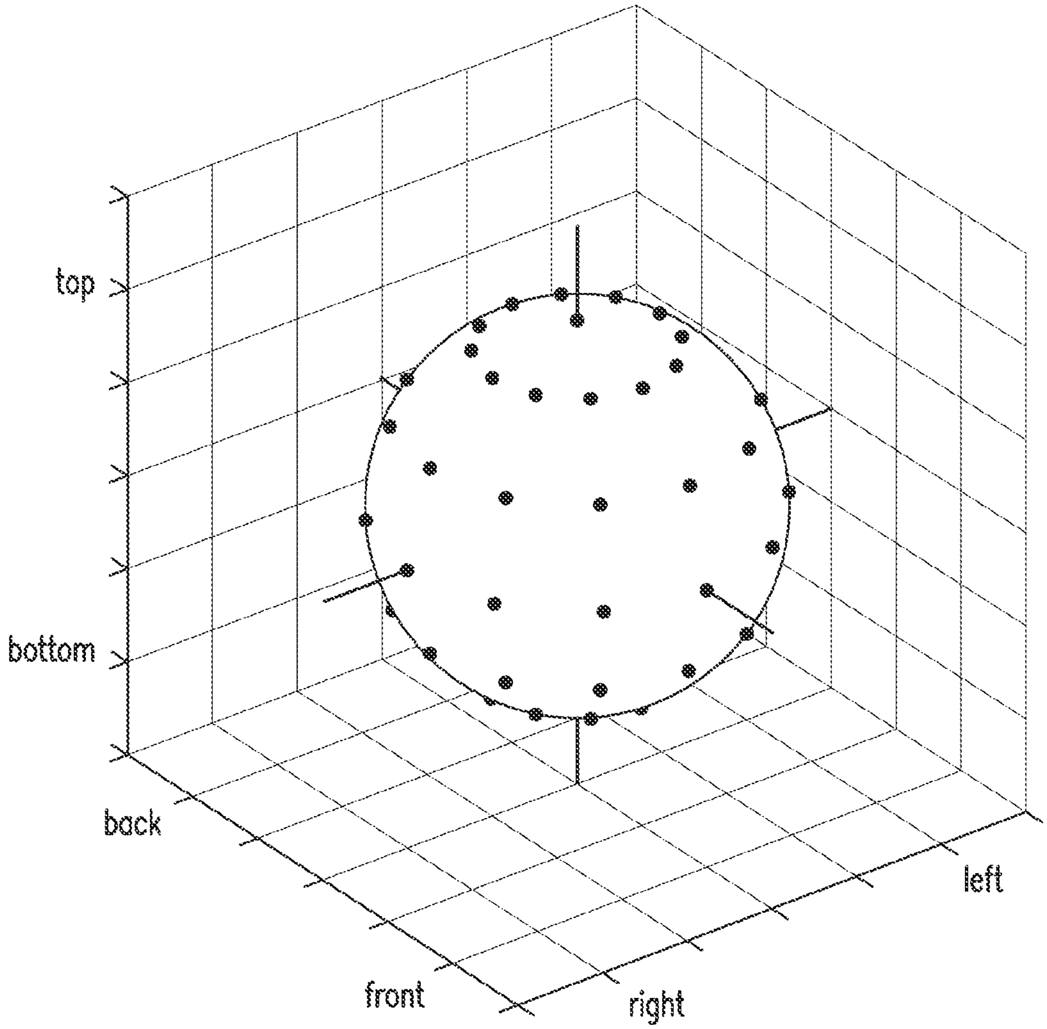
FIG. 3 shows an example of sampling grid on a 2D sphere.

As mentioned above, an HR filter is a mathematical representation of angular-related spatial cues including ITD, ILD, and spectral cues. The ITD is defined as the difference in arrival times of a sound signal at the two ears, as shown in FIG. 2. We remove the frequency-independent time delay from the HR filters and keep it separately as a pure delay for each pair of HR filters. The remaining zero-time delay HR filters contain interaural phase difference (IPD), ILD and spectral cues. The filters and the ITDs are modeled separately as functions of azimuth and elevation.

The variational approach was taken using existing HR filter databases most of which are publicly available. The HR filters in these databases are estimated from audio measurements done on different spatial sampling grids, and they are typically stored in different file formats that are naturally of advantage for the laboratory providing the database. Recently, the Spatially Oriented Format for Acoustics (SOFA) format was developed aiming at self-describing data with a consistent definition, which unifies the representation of different HR filter databases. Therefore, in one embodiment the SOFA format is adopted so that no extra effort is needed to exchange data format before modeling. More information on the SOFA format can be found here: www.sofaconventions.org/mediawiki/index.php.

Figure 5:
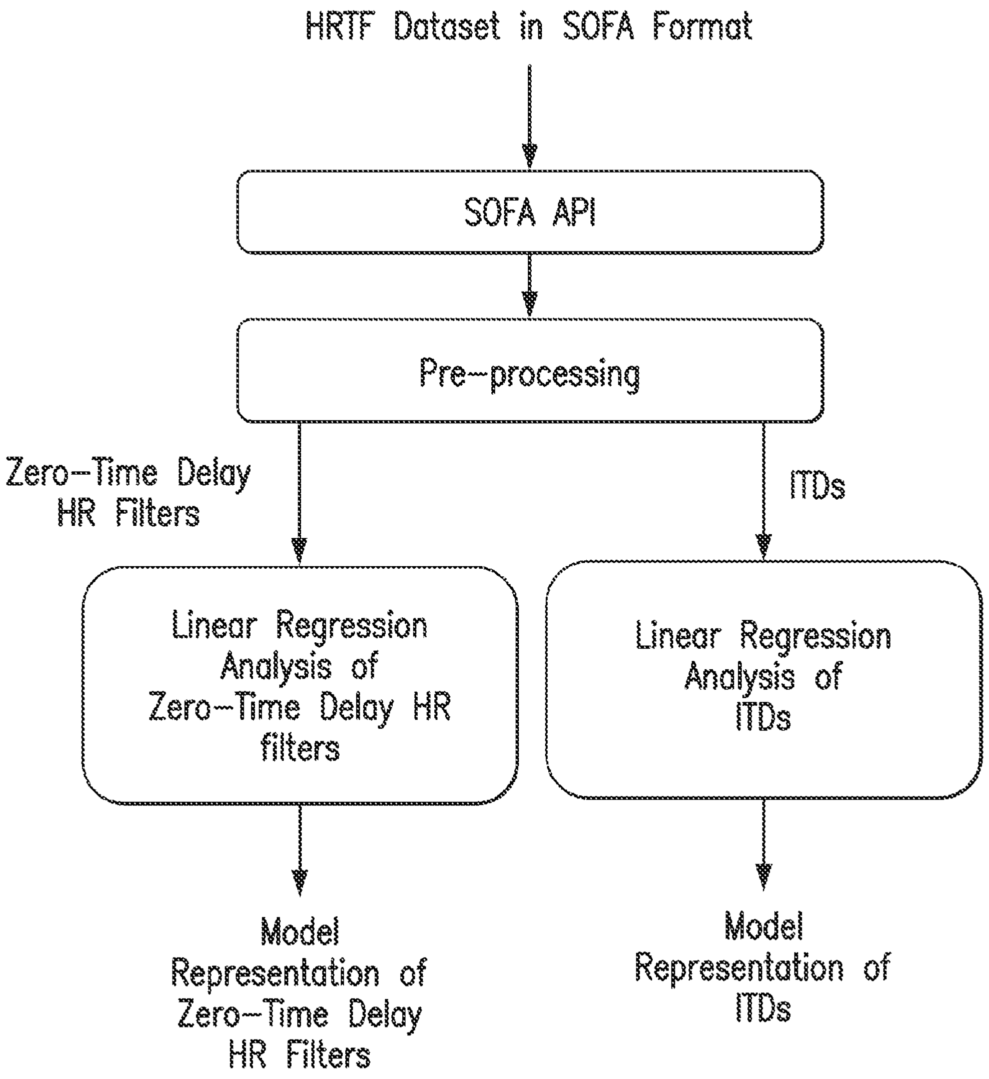
FIG. 5 is a flowchart showing one embodiment of HR filter modeling.

FIG. 5 describes a flowchart of one embodiment of HR filter modeling, where a set of HR filters in the SOFA format is loaded via the SOFA API. In the preprocessing unit, a frequency-independent time delay is estimated for each HR filter if no such information is provided in the original database. Then the HR filters are split into zero-time delay HR filters and ITDs. Finally, in the modeling unit the zero-time delay HR filters and the ITDs are modeled as linear sums of continuous basis functions of the elevation and azimuth angles, respectively.

The steps of Preprocessing, HR Filter Model Estimation and ITD Model Estimation are described in more detail in the first three subsections. After that, a description of the entire model representation is given.

1.1 Preprocessing

The basic procedure for estimating HR filter sets from measurements comprises the following steps:

(1) Emit a known signal via a loudspeaker placed at a specified elevation $\vartheta$, azimuth $\varphi$, and a fixed distance from a subject's head;

(2) Record the left and right ear signals of the subject using microphones placed in or at the entrance of the ear canals of the subject;

(3) Post-processing the recorded raw data, which is mainly to remove the response of the measurement system; and (4) Estimate the HR filters from the preprocessed data as the impulse response of a linear dynamic system with the known loudspeaker signal as the input signal and the preprocessed ear signals as the output signals.

Figure 6:
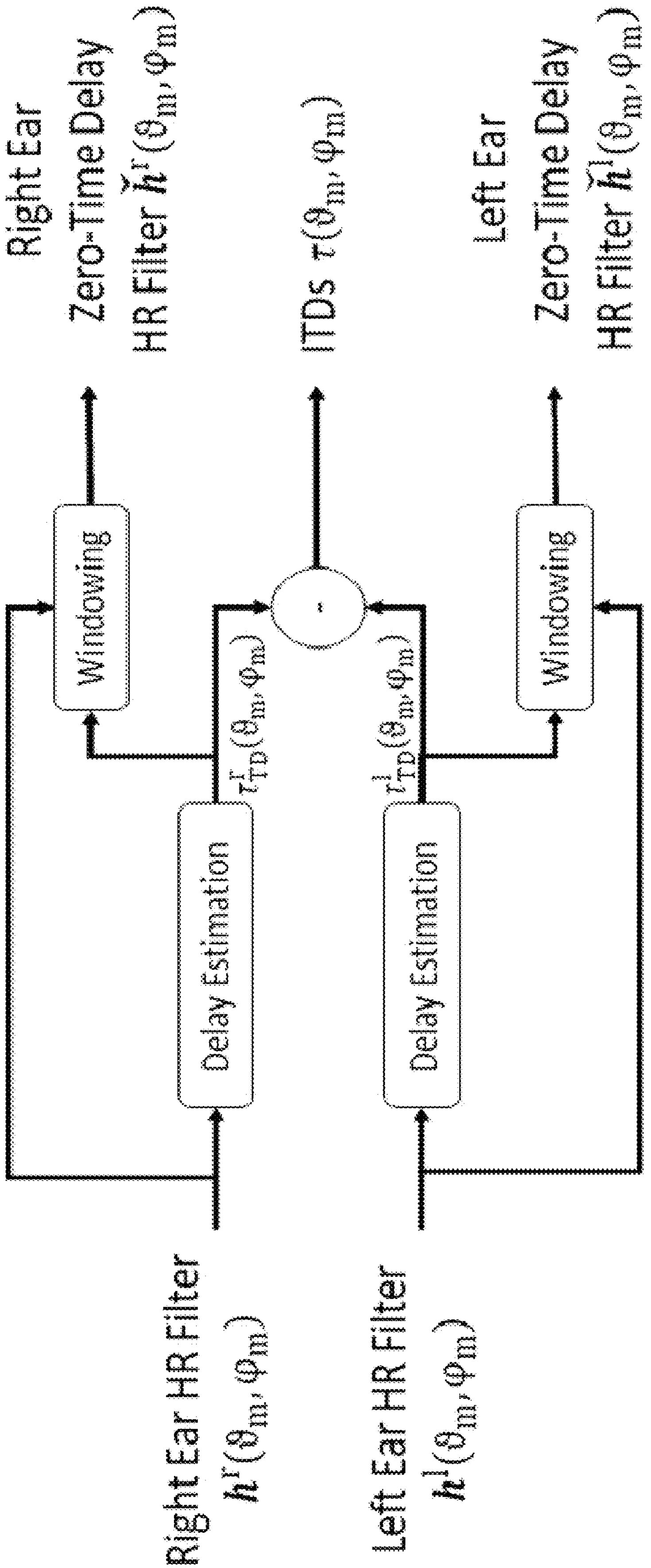
FIG. 6 is a flowchart describing the procedure of the preprocessing to obtain the zero-time delay HR filters and the ITDs according to an embodiment.

It is common that there exists a frequency-independent delay before the onset of the impulse responses. Some databases provide the onset information, e.g. the CIPIC database. However, most of the databases do not provide such information. As mentioned before, the HR filter sets can be modeled as the combination of a minimum phase-like system and a pure delay line. In that case a delay estimation is needed. Given the delay information, the ITD is simply calculated by subtracting the delay of the left ear HR filter from the delay of the right ear HR filter. Secondly, the delay is removed by windowing the HR filter and obtain the zero-time delay HR filter. The flowchart describing the procedure of the preprocessing to obtain the zero-time delay HR filters and the ITDs is illustrated in FIG. 6.

In the temporal structure of an HRIR it is easy to observe that a sudden increase of amplitude appears after the occurrence of an onset. Based on this temporal feature, one method to estimate the delay is to use an onset detection function which follows the energy envelope of the impulse response (IR). Such onset detection function can be constructed as $$E(n)=\frac{1}{L}\sum_{l=0}^{L-1}[h(nR+l)]^2w(l),$$

where {w(l): l=1, . . . , L} is an L sample long windowing function and R is the time step in samples between two windows. Without causing ambiguity, the angular arguments and the notation of the ear are omitted here for simplicity. The length of the window L can be chosen as the length of a segment that covers 90% of the entire energy of the HRIR. The above solution yields satisfactory results when a strong percussion transient exists in the HRIRs. However, this is not always the case, the solution is then refined by using the ratio of the cumulative energy to the overall energy, $$r_c(n)=\frac{E_C(n)}{E_h},$$

n=1, . . . N, where N is the length of the HRIR. The cumulative energy is defined as $$E_c(n)=\frac{1}{n}\sum_{l=0}^{n-1}[h(l)]^2w(l),$$

where w(l) is an n-point window. The overall energy is $$E_h=\frac{1}{N}\sum_{l=0}^{N-1}[h(l)]^2w(l).$$

Figure 7A:
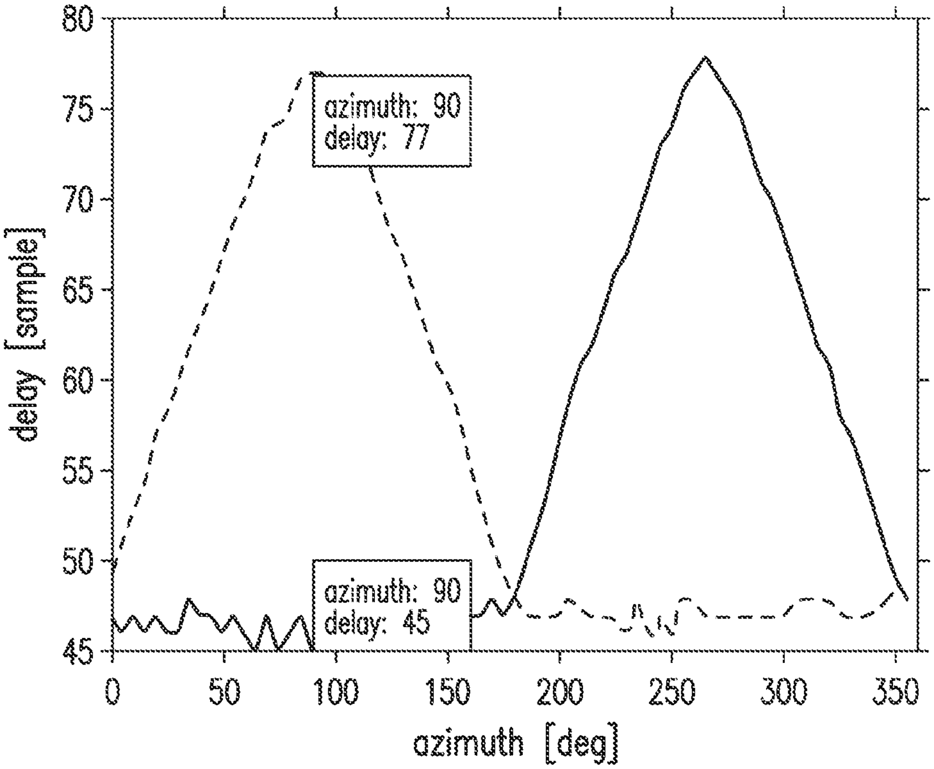
FIG. 7A illustrates the delay estimates of the right ear HRTFs (the solid curve) and the left ear HRTFs (the dashed curve) on the horizontal plane with elevation at 0 degree and azimuth from 0 degree to 360 degrees.
Figure 7B:
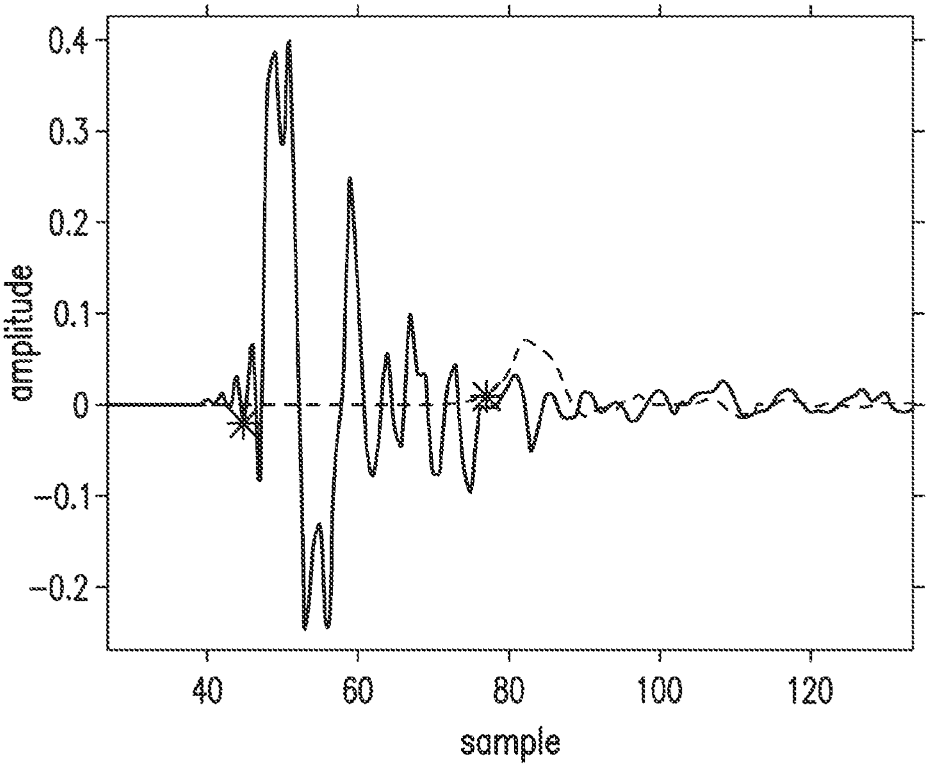
FIG. 7B illustrates the corresponding right ear HRTF (the solid curve) and the left ear HRTF (the dashed curve) at azimuth 90 degrees.

A further refinement takes the derivative of the ratio, and the index of the onset is found to be the index of the first sample when the derivative exceeds a certain threshold. The time delay $\tau_{TD}$ in sample can be written as $$\tau_{TD} = \min_n(\exists\, n : (r_c(n+1) - r_c(n)) > \eta),$$

where $\eta$ is the threshold. In general, the threshold for the ipsilateral HRTFs is higher than the contralateral HRTFs. FIGS. 7A and 7B show an example of estimated delay of HRTFs using Princeton HRTF dataset—Subject ID 27 (the URL for the database is www.princeton.edu/3D3A/HRTFMeasurements.html). The curves in FIG. 7A illustrate the delay estimates of the right ear HRTFs (the solid curve) and the left ear HRTFs (the dashed curve) on the horizontal plane with elevation at 0 degree and azimuth from 0 degree to 360 degrees. The delays of HRTFs at azimuth 90 degrees are shown in the data tips. The corresponding right ear HRTF (the solid curve) and the left ear HRTF (the dashed curve) at azimuth 90 degrees are shown in FIG. 7B. The stars highlight the detected onset.

Given the delay estimate, the zero-time delay HR filters can be obtained by windowing the original HR filters. It is known that the most significant localization dependent effect on the spectral content of the HR filters can be traced to the outer ears, or pinnae, which lasts around 0.3 msec. The 'shoulder bounce' effect comes later. The overall length of the localization dependent IR usually won't exceed 1 msec. Therefore, a 1 msec rectangular window is long enough to preserve the main spectral-related cues. A longer window may not be necessary if no further localization relevant information is added.

1.2 HR Filter Model Estimation

The HR filters of the right ear and the left ear are modeled separately. The general truncated time domain (TD) FIR model for the HR filter $h(\vartheta, \varphi)=(h_1(\vartheta, \varphi), \ldots, h_N(\vartheta, \varphi))^T$ of length N, with separated basis functions for elevation and azimuth, is given below in two possible expansion forms, the elevation expansion form and the azimuth expansion form.

$$\hat{h}(\vartheta, \varphi) = \begin{pmatrix} \hat{h}_1(\vartheta, \varphi) \\ \vdots \\ \hat{h}_N(\vartheta, \varphi) \end{pmatrix} = \begin{cases} \sum_{p=1}^{P}\sum_{q=1}^{Q_p}\sum_{k=1}^{K} \alpha_{p,q,k}\Theta_p(\vartheta)\Phi_{p,q}(\varphi)e_k & \text{(Elevation Expansion Form)} \\ \sum_{q=1}^{Q}\sum_{p=1}^{P_q}\sum_{k=1}^{K} \alpha_{p,q,k}\Theta_{q,p}(\vartheta)\Phi_q(\varphi)e_k & \text{(Azimuth Expansion Form)} \end{cases}$$

In the elevation expansion form, there is a single set of basis functions for the elevation dimension, $\{\Theta_p$: p=1, . . . , P} and P sets of basis functions for the azimuth dimension, one set for each elevation index p, $\{\Phi_{p,q}$: q=1, . . . , $Q_p\}$. K<N is the number of basis vectors for the N-dim vector space of the filter parameter vector and the $e_k$–s are the canonical orthonormal basis vectors of length N, $$e_1 = \begin{pmatrix} 1 \\ 0 \\ 0 \\ \vdots \\ 0 \end{pmatrix}, e_2 = \begin{pmatrix} 0 \\ 1 \\ 0 \\ \vdots \\ 0 \end{pmatrix}, \ldots\ e_N = \begin{pmatrix} 0 \\ \vdots \\ 0 \\ 0 \\ 1 \end{pmatrix}.$$

$\alpha=\{\alpha_{p,q,k}$: p=1, . . . , P; q=1, . . . , $Q_p$; k=1, . . . , K} is the set of model parameters that needs to be estimated. Since the FIR model is truncated, K<N, the HR filter model values $\hat{h}_{K+1}(\vartheta, \varphi), \ldots, \hat{h}_N(\vartheta, \varphi)$ are equal to 0.

The azimuth expansion form is a mirrored form of the elevation expansion form with the corresponding mirrored terminology. From now on we will show properties for the elevation expansion form. These properties also hold in a mirrored sense for the azimuth expansion form and a person of ordinary skill in the art can induce those mirrored properties from those of the elevation expansion form.

The elevation expansion form is very flexible in that it supports an individual set of azimuth basis functions for each elevation index p. This full-scale flexibility is not always needed, but it is definitely a good idea to use more than one set of azimuth basis functions. At elevation angles +/−90 degrees, which are respectively directly above and directly below the listener, the HR filters at the different azimuth angles are all the same. This can be handled by using a single azimuth basis function equal to 1 for the elevation indexes p that have basis functions contributing to the elevation angles +/−90 degrees. The other elevation indexes could share a single but different set of azimuth basis functions with the number of basis functions Q>1, or share a few sets of azimuth basis functions carefully chosen to capture the elevation-azimuth variation of the filter set being modeled.

In what follows we will derive properties for the general elevation extension form. However, it will be clear to the person skilled in the art how those properties are modified when the number of different sets of azimuth basis functions is less than P.

To estimate the model parameters $\{\alpha_{p,q,k}\}$, two things are required.

(1) A minimization criterion needs to be specified, which is typically in the form of a measure of the modeling error in the time domain, the frequency domain or a combination of both and this criterion might even include regularization terms to decrease tendencies to overfit the data being modeled.

(2) An optimization method to estimate the parameters that minimize the minimization criterion.

Figure 8:
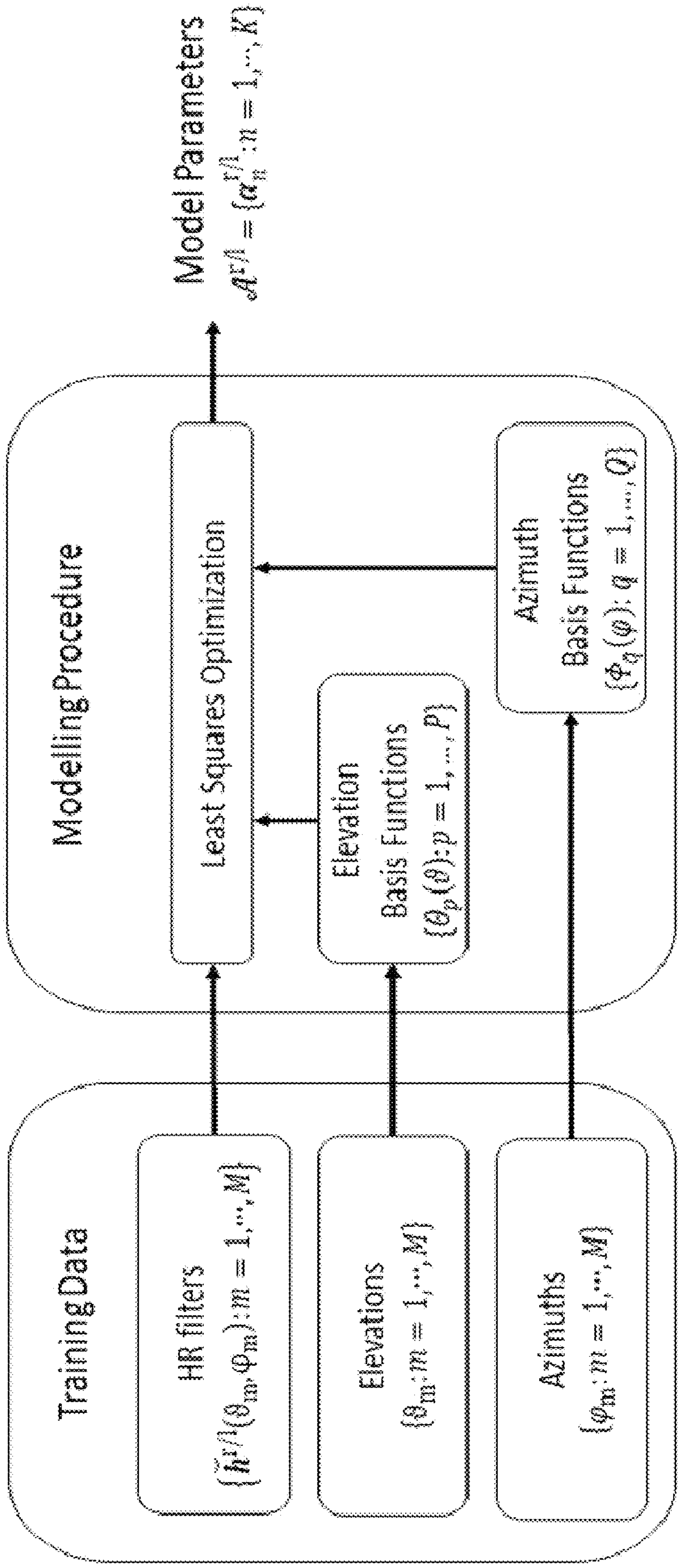
FIG. 8 depicts a block diagram of a modeling procedure according to an embodiment.

FIG. 8 depicts the block diagram of the modeling procedure given a set of zero-time delay HR filters $\{\check{h}^{r/l}(\vartheta_m, \varphi_m)$: m=1, . . . , M} associated with the corresponding elevation and azimuth angles, i.e., $\{(\vartheta_m, \varphi_m)$: m=1, . . . , M}. Given a list of elevations and azimuths, the basis functions over elevation angles and azimuth angles are constructed, respectively. Then the least squares approach is taken to estimate the model parameters.

This model estimation procedure is described in more detail in subsection 1.2.1.

At this stage the model specification is rather generic as the two sets of basis functions $\{\Theta_p(\vartheta)$: p=1, . . . , P} and $\{\Phi_{p,q}(\varphi)$: q=1, . . . , $Q_p\}$ have not been specified. The key to obtaining a model that can deliver both accurate modeling and efficient evaluation of the HR filters lies in the choice of these two sets of basis functions. After experimenting with different types of functions, we have chosen to use what we call periodic B-spline basis functions for the azimuth basis functions and standard B-spline functions for the elevation basis functions. These chosen basis functions are explained in more detail in subsection 1.2.2.

1.2.1 Model Parameter Estimation

Given the sets of basis functions $\{\Theta_p(\vartheta)$: p=1, . . . , P} and $\{\Phi_{p,q}(\varphi)$: q=1, . . . , $Q_p\}$ and a set of zero-time delay HR filters of the right or the left ear sampled at M different angle positions $\{\breve{h}^{r/l}(\vartheta_m, \varphi_m)$: m=1, . . . , M}, a typical minimization criterion in the time domain is the sum of the norms of the modeling errors over the set of M HR filters (either right ear or left ear), $$J(\alpha) = \sum_{m=1}^{M} \| \breve{h}(\vartheta_m, \varphi_m) - \hat{h}(\vartheta_m, \varphi_m) \|^2 \text{ where}$$

$$\breve{h}(\vartheta_m, \varphi_m) = \begin{pmatrix} \breve{h}_1(\vartheta_m, \varphi_m) \\ \vdots \\ \breve{h}_N(\vartheta_m, \varphi_m) \end{pmatrix} \text{ and}$$

$$\hat{h}(\vartheta_m, \varphi_m) = \begin{pmatrix} \hat{h}_1(\vartheta_m, \varphi_m) \\ \vdots \\ \hat{h}_N(\vartheta_m, \varphi_m) \end{pmatrix} = \sum_{p=1}^{P}\sum_{q=1}^{Q_p}\sum_{k=1}^{K} \alpha_{p,q,k}\Theta_p(\vartheta_m)\Phi_{p,q}(\varphi)e_k.$$

The number of parameters estimated is $(\Sigma_{p=1}^{P} Q_p)$*K, which should be much fewer than the number of available data samples M*N to avoid an underdetermined system.

As the canonical orthonormal basis vectors $e_k$ are orthonormal vectors, the parameters $\alpha_k=\{\alpha_{p,q,k}$: p=1, . . . , P; q=1, . . . , $Q_p\}$ can be solved independently for each sample k. For each sample k the minimization criterion becomes $$J(\alpha_k)=\Sigma_{m=1}^{M}|\breve{h}_k(\vartheta_m,\varphi_m)-\Sigma_{p=1}^{P}\Sigma_{q=1}^{Q_p}\alpha_{p,q,k}\Theta_p(\vartheta_m)\Phi_{p,q}(\varphi_m)|^2.$$

It can be expressed in matrix form as $$J(\alpha_k) = \left\| \underbrace{\begin{pmatrix} \breve{h}_k(\vartheta_1, \varphi_1) \\ \vdots \\ \breve{h}_k(\vartheta_M, \varphi_M) \end{pmatrix}}_{\breve{h}_k} - \underbrace{\begin{pmatrix} b(\vartheta_1, \varphi_1) \\ \vdots \\ b(\vartheta_M, \varphi_M) \end{pmatrix}}_{B}\alpha_k \right\|^2 = \| \breve{h}_k - B\alpha_k \|^2, \text{ where}$$

$$\begin{aligned} b(\vartheta_m, \varphi_m) &= (\Theta_p(\vartheta_m)\Phi_{p,q}(\varphi_m) : p = 1, \cdots, P; q = 1, \cdots, Q_p)_{row\ vector} \\ \alpha_k &= (\alpha_{p,q,k} : p = 1, \cdots, P; q = 1, \cdots, Q_p)_{column\ vector} \end{aligned}.$$

$J(\alpha_k)$ is a linear least squares criterion. The solution that minimizes $J(\alpha_k)$ is obtained by solving the normal equation $\alpha_k=(B^TB)^{-1}B^T\breve{h}_k$. However, minimizing directly the above cost function leads to an exact solution to the linear system. Such solution is sensitive to noise in the data $\breve{h}_k$ and can result in overfitting. Tikhonov regularization is then applied, and the minimization criterion becomes $$\bar{\bar{J}}(\alpha_k) = \left\|\breve{h}_k - B\alpha_k\right\|^2 + \lambda^2\|\alpha_k\|^2 = \left\| \underbrace{\begin{bmatrix} \breve{h}_k \\ 0 \end{bmatrix}}_{\bar{\bar{h}}_k} - \underbrace{\begin{bmatrix} B \\ \lambda I \end{bmatrix}}_{\bar{\bar{B}}}\alpha_k \right\|^2 = \left\|\bar{\bar{h}}_k - \bar{\bar{B}}\alpha_k\right\|^2.$$

Where I is the identity matrix of size $\Sigma_{p=1}^{P} Q_p$ and 0 is a zero-column vector with $\Sigma_{p=1}^{P} Q_p$ elements.

$J(\alpha_k)$ is also a linear least squares criterion. Similarly, the solution that minimizes $\bar{\bar{J}}(\alpha_k)$ is obtained by solving the normal equation $\alpha_k=(\bar{\bar{B}}^T\bar{\bar{B}})^{-1}\bar{\bar{B}}^T\bar{\bar{h}}_k$, where the value of λ could be determined such that the condition number of the matrix $\bar{\bar{B}}$ is less than 10 or some other value that leads to good model accuracy.

For better numerical accuracy, $\alpha_k$ is actually solved with the help of the singular value decomposition (SVD) of $\bar{\bar{B}}$, $$\bar{\bar{B}}=USV^T$$

The columns of $\bar{\bar{B}}$ and U span the same subspace. The projection of $\bar{\bar{h}}_k$ onto the orthonormal matrix U is given by $UU^T\bar{\bar{h}}_k$ and equals $\bar{\bar{B}}\alpha_k=USV^T\alpha_k$. This gives $SV^T\alpha_k=U^T\bar{\bar{h}}_k$, which then gives the solution $\alpha_k=VS^{-1}U^T\bar{\bar{h}}_k$. This estimation is very efficient as it only requires one SVD of $\bar{\bar{B}}$ that is a matrix of relatively small dimension, which is then used to evaluate the solutions for k=1, . . . , K that could be done in parallel. The same holds for $J(\alpha_k)$, replacing $\bar{\bar{B}}$ with B and $\bar{\bar{h}}_k$ with $h_k$.

Given the right ear HR filter measurements $h_k^r$, we obtain a set of model parameters denoted by $\mathcal{A}=\{\alpha_1^r, \ldots, \alpha_K^r\}$, where each $\alpha^r$ is a column vector of dimension $\Sigma_{p=1}^{P} Q_p$. Similarly, given the left ear HR filter measurements $h_k^l$, we obtain a set of model parameters denoted by $\mathcal{A}=\{\alpha_1^l, \ldots, \alpha_K^l\}$, where each $\alpha^l$ is a column vector of dimension $\Sigma_{p=1}^{P} Q_p$.

The minimization criterions $J(\alpha)$ and $\bar{\bar{J}}(\alpha)$ are specified in the time domain. They are easily mapped to the frequency domain by mapping the time domain vectors $\breve{h}(\vartheta_m, \varphi_m)$ and $\hat{h}(\vartheta_m, \varphi_m)$ into frequency domain vectors with a DFT transformation or something similar, e.g., Interaural Transfer Function (ITF), and alternative criterions could easily use combinations of time domain and frequency domain components.

The squared norm of a vector v is defined as the inner product of the vector with itself $\|v\|^2=\langle v,v\rangle$. A general form of the inner product is $\langle v,v\rangle=v^T\Gamma v$ where Γ can be any positive definite matrix and in its most simple form Γ is the identity matrix. Using a Γ that is different from the identity matrix provides a mechanism to weight different components differently in the time and frequency domains which can be useful when some components are more perceptually important than others. How to make use of these various possibilities in the specification of the minimization criterion should be clear to those that are skilled in the art.

1.2.2 Specification of the Elevation and Azimuth Basis Functions

As explained earlier, after experimenting with different types of basis functions, we have chosen to use standard B-spline functions for the elevation basis functions and what we call periodic B-spline basis functions for the azimuth basis functions.

A set of univariate B-spline basis functions of order J over the variable ϑ, where ϑ is in the interval $\theta_A \le \vartheta \le \theta_B$, is a set of piecewise polynomial functions of degree J−1 defined over that interval. The ranges over which the functions are polynomials are specified with the so-called knot sequence $\theta=(\theta_1, \ldots, \theta_U)$, where $\theta_1=\theta_A$, $\theta_U=\theta_B$ and the sub-intervals over which the functions are polynomials are $\theta_u \le \vartheta \le \theta_{u+1}$ for u=1, . . . , U−1. In each sub-interval each basis function is a polynomial function of degree J−1, which is written as:

$$\Theta_p(\vartheta) = \sum_{j=0}^{J-1} \gamma_{j,u,p}^{\Theta}\vartheta^j, \text{ for } \theta_u \le \vartheta < \theta_{u+1}.$$

The smoothness at the knot-points of a function that is a linear sum of the B-spline basis functions is controlled with the so-called multiplicity sequence $m=(m_1, \ldots, m_U)$, which is a sequence of integers greater than 0 where the value $m_u$=i means that the (J−i)-th derivative at knot-point $\theta_u$ is continuous. This means that i=1 gives maximum smoothness, while i=J only gives 0-th derivative continuity. Given the knot sequence and the multiplicity sequence the polynomial model coefficients $\gamma^{\Theta}=\{\gamma_{j,u,p}^{\Theta}$: j=0, . . . , J; u=1, . . . , U−1; p=1, . . . , P} are obtained iteratively starting with the 0-th degree polynomials. The details of this procedure can be found in the article Bspline Basics by Carl de Boor ftp://ftp.cs.wisc.edu/Approx/bsplbasic.pdf.

Figure 9:
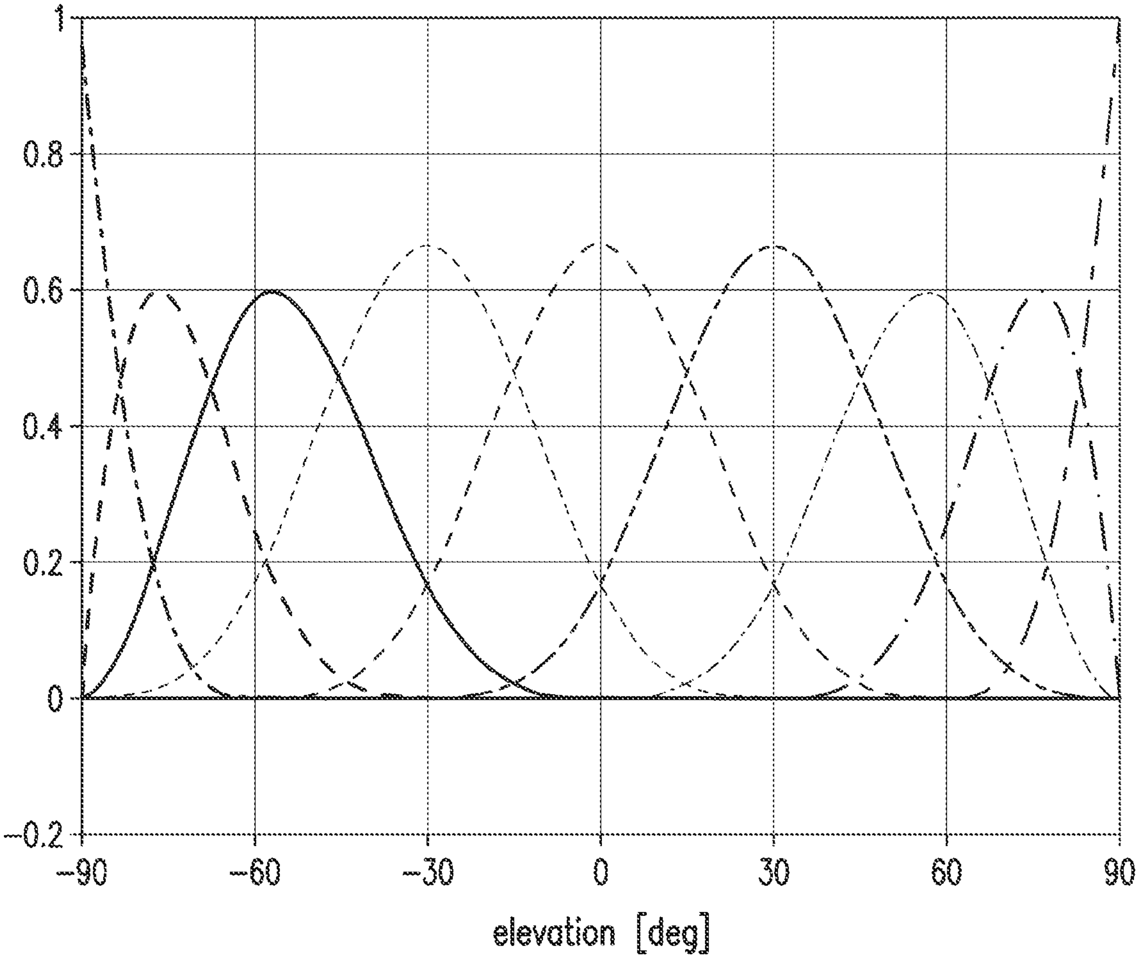
FIG. 9 shows an example of B-spline basis functions.

An example of the B-spline basis functions for the elevation angle of degree 3 evaluated using the knot sequence θ=(−90, −60, −30, 0, 30, 60, 90) and the multiplicity sequence m=(4, 1, 1, 1, 1, 1, 3) is illustrated in FIG. 9.

Figure 10:
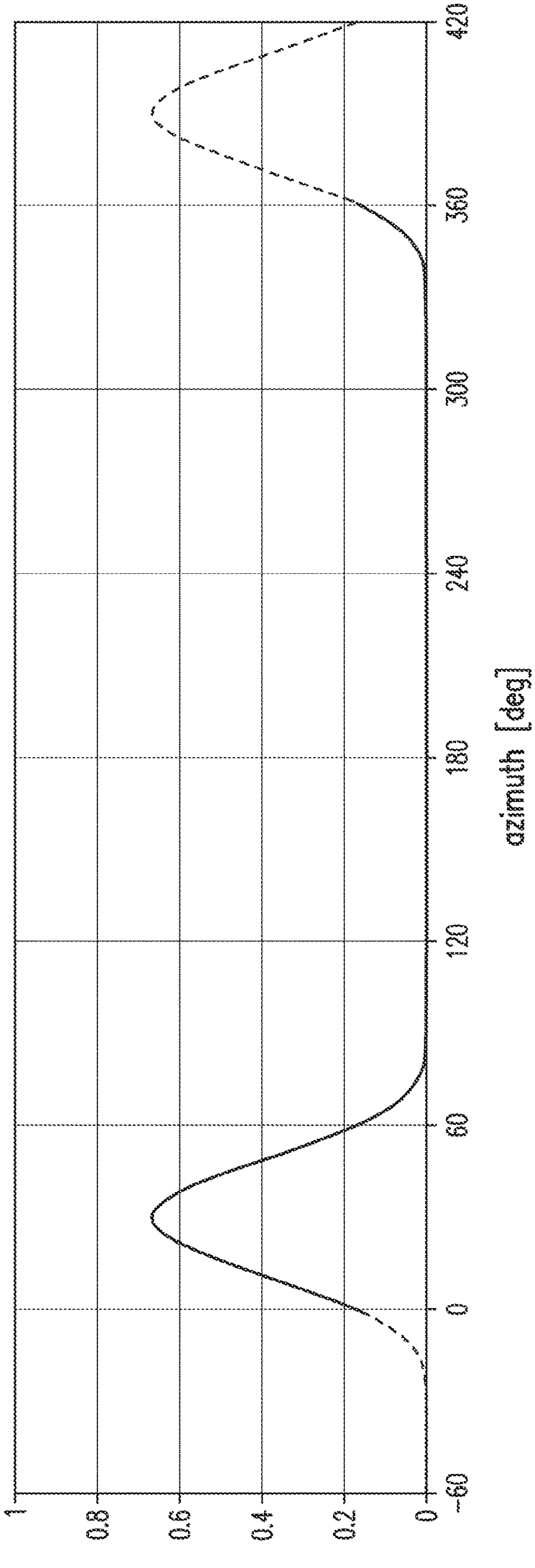
FIG. 10 shows an example of a periodic basis function.

The azimuth angles are periodic (e.g., circular) in the meaning that the azimuth angle of φ degrees is the same point in space as the azimuth angle of φ+κ*360 degrees for any integer valued K and to obtain efficient modeling in the azimuth dimension it is important to use basis functions that are periodic in the same way such that f(φ)=f(φ+κ*360). An example of such a periodic basis function is illustrated in FIG. 10, where the part of the function in the angle range from 0 to 360 is plotted with a solid line and the part of the function outside of that range is plotted with a dotted line.

Figure 11:
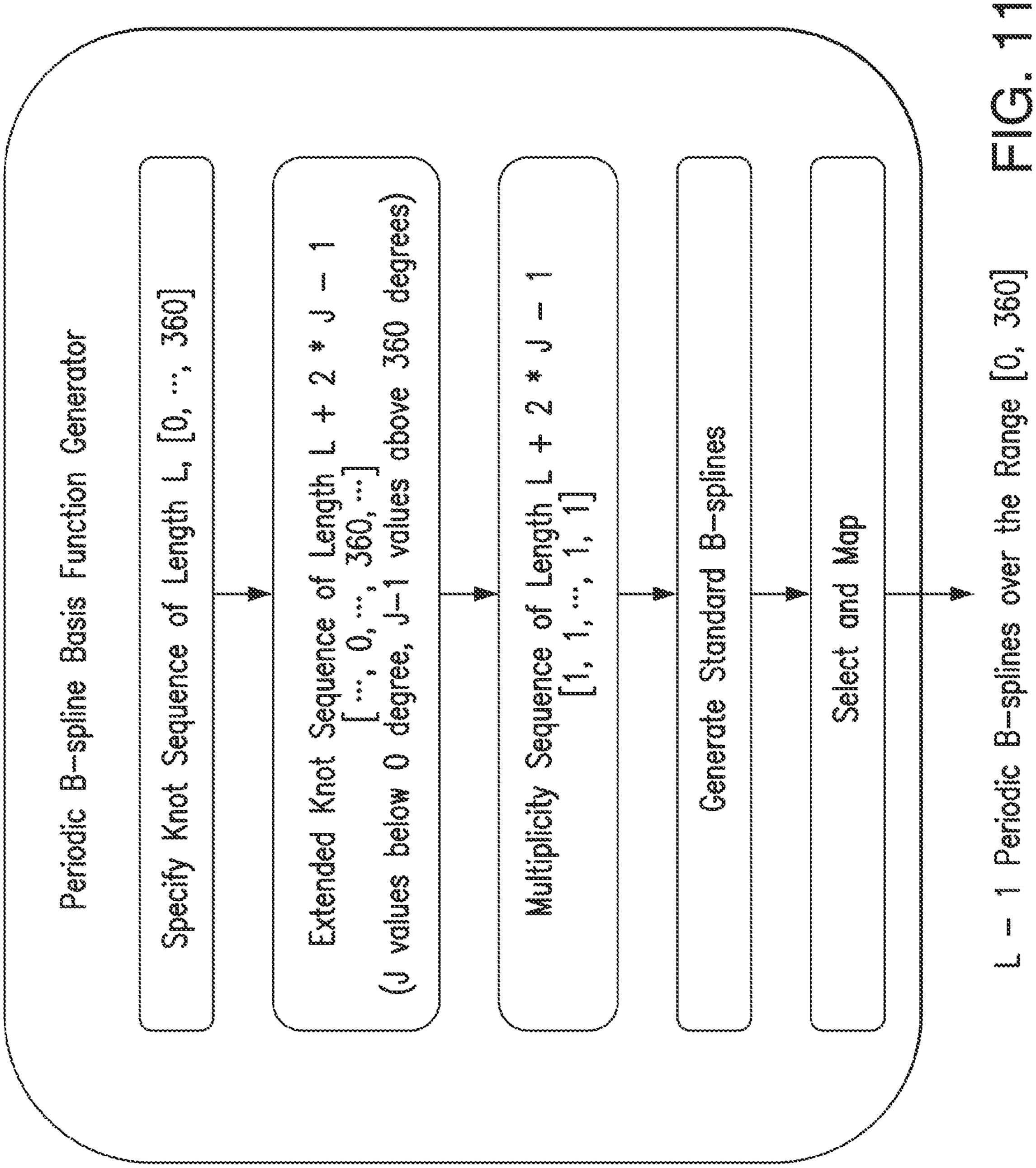
FIG. 11 illustrates a process according to an embodiment.

We have devised a method for generating a set of periodic B-spline basis functions over the azimuth range 0 to 360 degrees. The method is illustrated in FIG. 11. It comprises the following steps.

(Step 1) Specify a knot sequence over the range 0 to 360 degrees. Denote the length of that knot sequence as L.

(Step 2) Extend that knot sequence in a periodic manner with J values below 0 degrees and J−1 values above 360 degrees.

(Step 3) Use this extended knot sequence and an extended multiplicity sequence of ones to generate a set of extended B-spline basis functions using the standard method for generating sets of B-spline functions.

(Step 4) Choose the L−1 consecutive of those extended basis functions starting at index 2 and map those in a periodic fashion to the azimuth range of 0 to 360 degrees.

This method provides a set of L−1 periodic basis functions over the range of 0 to 360 degrees.

Each basis function over azimuth angles is also a polynomial function of degree J−1, and written as:

$$\Phi_p(\varphi)=\sum_{j=0}^{J-1}\gamma_{j,l,q}^{\phi}\varphi^j,\ \phi_l\le\varphi<\phi_{l+1}.$$

Figure 12:
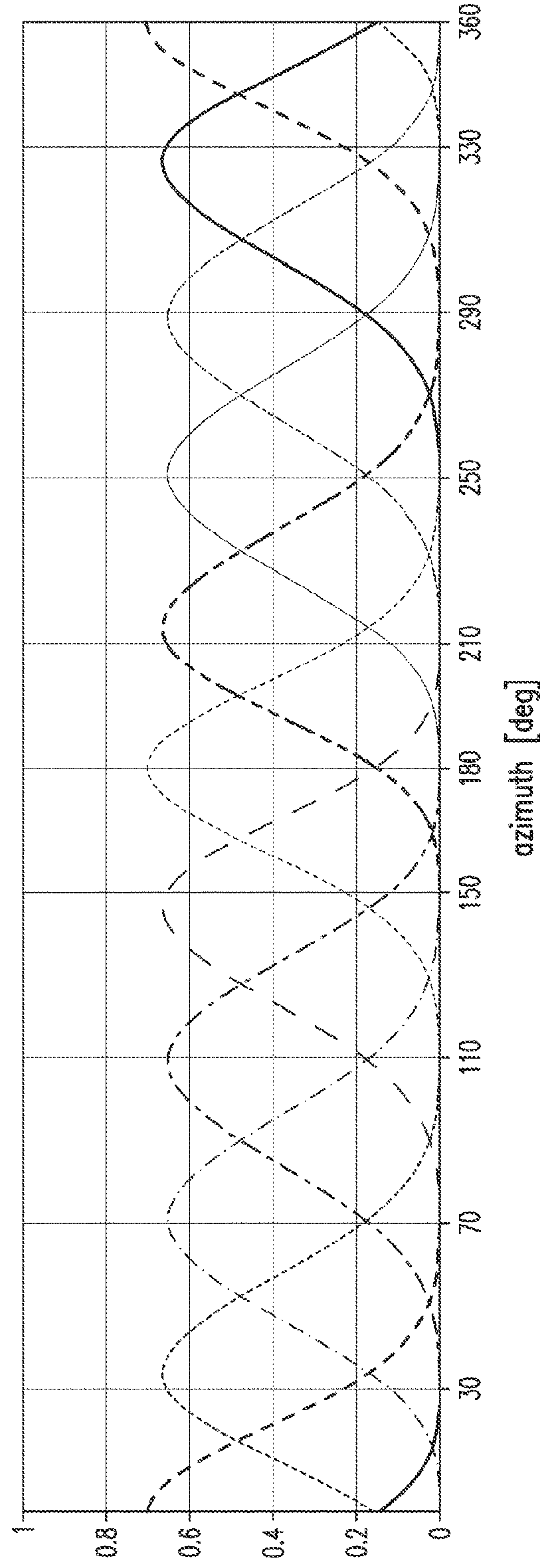
FIG. 12 illustrates an example of periodic B-spline basis functions.

An example of the periodic B-spline basis functions for the azimuth angle of degree 3 evaluated using the knot sequence: ϕ=(0, 30, 70, 110, 150, 180, 210, 250, 290, 330, 360) of length L=11 is illustrated in FIG. 12.

1.3 ITD Model Estimation

A general form of the ITD model is given by:

$$\hat{\tau}(\vartheta,\varphi)=\sum_{\tilde{p}=1}^{\tilde{P}}\sum_{\tilde{q}=1}^{\tilde{Q}_{\tilde{p}}}c_{\tilde{p},\tilde{q}}\tilde{\Theta}_{\tilde{p}}(\vartheta)\tilde{\Phi}_{\tilde{p},\tilde{q}}(\varphi).$$

$\{\tilde{\Theta}_{\tilde{p}}(\vartheta)$: p̃=1, . . . , P̃} and $\{\tilde{\Phi}_{\tilde{p},\tilde{q}}(\varphi)$: q̃=1, . . . , $\tilde{Q}_{\tilde{p}}\}$ are the B-spline basis functions over the elevation angles and the azimuth angles, respectively. $\{c_{\tilde{p},\tilde{q}}\}$ is a set of model parameters.

1.3.1 Model Parameter Estimation

The model parameters $\{c_{p',q'}\}$ are obtained by minimizing the least squares criterion, $$J(c)=\sum_{m=1}^{M}|\tau(\vartheta_m,\varphi_m)-\hat{\tau}(\vartheta_m,\varphi_m)|^2=$$

$$\left\|\underbrace{\begin{pmatrix}\tau(\vartheta_1,\varphi_1)\\ \vdots\\ \tau(\vartheta_M,\varphi_M)\end{pmatrix}}_{\tau}-\underbrace{\begin{pmatrix}\tilde{b}(\vartheta_1,\varphi_1)\\ \vdots\\ \tilde{b}(\vartheta_M,\varphi_M)\end{pmatrix}}_{\tilde{B}}c\right\|^2=\|\tau-\tilde{B}c\|^2,\text{ Where}$$

$$\begin{aligned}\tilde{b}(\vartheta_m,\varphi_m)&=\left(\tilde{\Theta}_{\tilde{p}}(\vartheta_m)\tilde{\Phi}_{\tilde{p},\tilde{q}}(\varphi_m):\tilde{p}=1,\cdots,\tilde{P};\tilde{q}=1,\cdots,\tilde{Q}_{\tilde{p}}\right)_{row\ vector}\\ c&=\left(c_{\tilde{p},\tilde{q}}:\tilde{p}=1,\cdots,\tilde{P};\tilde{q}=1,\cdots,\tilde{Q}_{\tilde{p}}\right)_{column\ vector}\end{aligned}.$$

$\tau(\vartheta_m,\varphi_m)=\tau_{TD}^{r}(\vartheta_m,\varphi_m)-\tau_{TD}^{l}(\vartheta_m,\varphi_m)$ is the ITD at $(\vartheta_m,\varphi_m)$. $\tau_{TD}^{r/l}(\vartheta_m,\varphi_m)$ is the frequency-independent time delay, either provided by the original database or estimated using the method described in subsection 1.1.

Applying Tikhonov regularization to avoid overfitting, the minimization criterion becomes:

$$\bar{\bar{J}}(c)=\|\tau-\tilde{B}c\|^2+\tilde{\lambda}^2\|c\|^2=\left\|\underbrace{\begin{bmatrix}\tau\\0\end{bmatrix}}_{\tilde{\tau}}-\underbrace{\begin{bmatrix}\tilde{B}\\ \tilde{\lambda}\tilde{I}\end{bmatrix}}_{\tilde{B}'}c\right\|^2=\|\tilde{\tau}-\tilde{B}'c\|^2,$$

where Ĩ is the identity matrix of size $\Sigma_{\tilde{p}=1}^{\tilde{P}}\tilde{Q}_{\tilde{p}}$ and 0 is a zero-column vector with $\Sigma_{\tilde{p}=1}^{\tilde{P}}\tilde{Q}_{\tilde{p}}$ elements.

The value of $\tilde{\lambda}$ could be determined such that the condition number of the matrix B̃' is less than 10 or some other value that leads to good model accuracy. As described in subsection 1.2.1, with the help of SVD of $\tilde{B}'=U'S'V'^T$, the model parameters are obtained by $c=V'S'^{-1}U'^T\tau$, which is a column vector with $\Sigma_{\tilde{p}=1}^{\tilde{P}}\tilde{Q}_{\tilde{p}}$ elements.

1.3.2. Specification of the Elevation and Azimuth Basis Functions

When elevation moves upwards from −90 degrees to 90 degrees, ITD increases from zero to maximum at elevation 0 degree and then decreases to zero. Based on this, it is natural to use basis functions which are zero at elevations +/−90 degrees. This requirement amounts to at least one smoothness condition at the elevations +/−90 degrees. As explained in subsection 1.2.2, the smoothness at the knot-points of a function is controlled by the multiplicity sequence m. Each basis function is written as:

$$\tilde{\Theta}_{\tilde{p}}(\vartheta)=\sum_{j=0}^{J-1}\gamma_{j,\tilde{u},\tilde{p}}^{\tilde{\Theta}}\vartheta^j,\ \tilde{\theta}_{\tilde{u}}\le\vartheta<\tilde{\theta}_{\tilde{u}+1}.$$

Figure 13A:
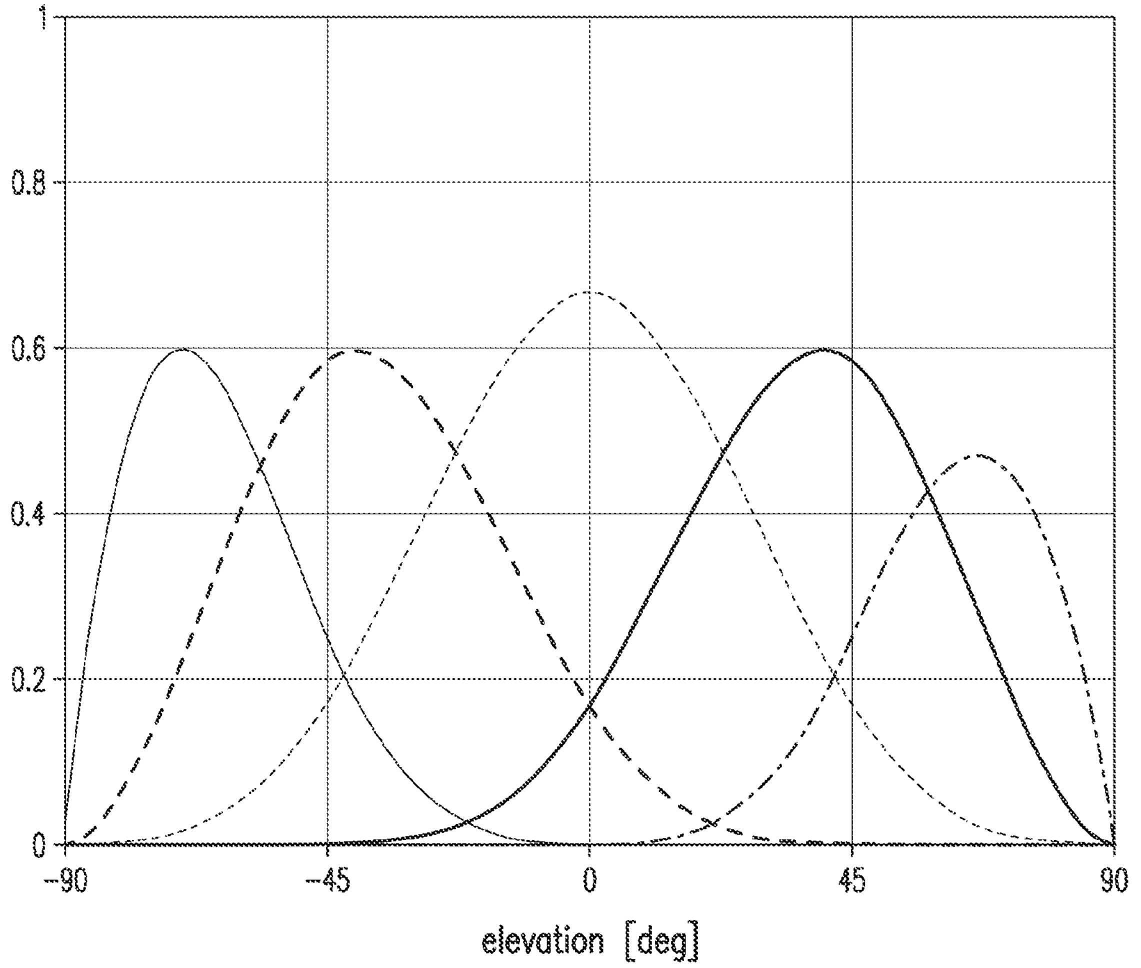
FIG. 13A illustrates an example of B-spline basis functions.

An example of the B-spline basis functions for the elevation angle of degree 3 evaluated using the knot sequence θ̃=(−90, −45, 0, 45, 90) and the multiplicity sequence m=(3, 1, 1, 1, 2) is illustrated in FIG. 13A.

Figure 13B:
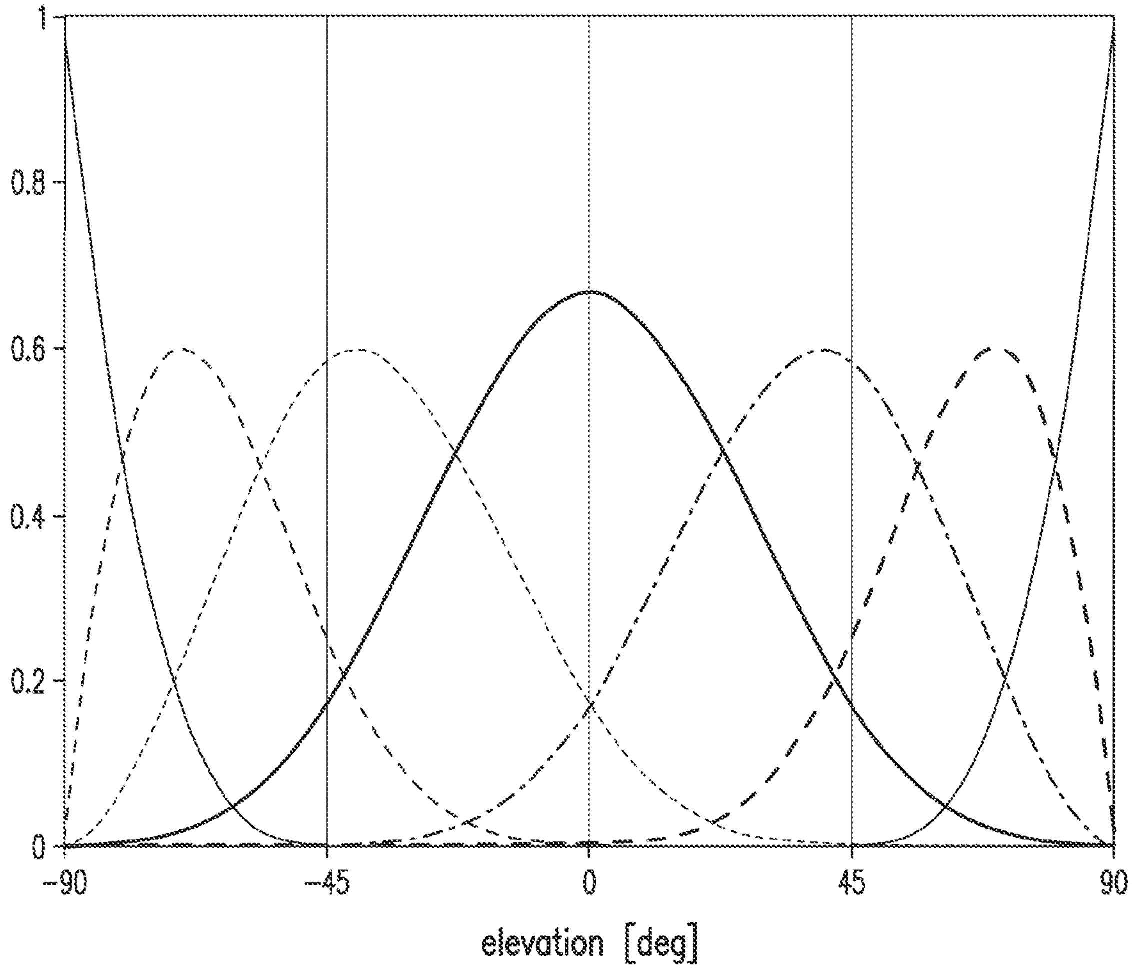
FIG. 13B illustrates an example of standard B-spline basis functions.

Considering that ITD may not be exactly zero at elevations +/−90 degrees due to asymmetry in the measurement setup and the subject, it remains a good choice to use a standard B-spline basis functions without smoothness condition at the knot-points +/−90 degrees. An example of the standard B-spline basis functions for the elevation angle of degree 3 evaluated using the knot sequence θ=(−90, −45, 0, 45, 90) and the multiplicity sequence m=(4, 1, 1, 1, 3) is illustrated in FIG. 13B.

When azimuth moves along a circle, the change of ITD follows a sinusoidal-like shape, where the zero ITD occurs at azimuth 0/180/360 degrees and the maximum ITD occurs at azimuth 90/270 degrees. Similarly, one smoothness condition may be satisfied at azimuths 0/180/360 degrees. Moreover, the ITDs at azimuths between 180 to 360 degrees can be considered as a mirror of those at azimuths between 0 to 180 degrees. Therefore, we use one set of basis functions for azimuth angle at two intervals, [0, 180] and [180, 360]. Each basis function is written as:

$$\Phi_{\tilde{q}}(\varphi) = \begin{cases} \sum_{j=0}^{J-1} \gamma^{\Phi}_{j,\tilde{l},\tilde{q}} \varphi^j, & \varphi \le 180 \text{ and } \tilde{\phi}_{\tilde{l}} \le \varphi < \tilde{\phi}_{\tilde{l}+1} \\ \sum_{j=0}^{J-1} \gamma^{\Phi}_{j,\tilde{l},\tilde{q}} (360-\varphi)^j, & \varphi > 180 \text{ and } \tilde{\phi}_{\tilde{l}} \le 360-\varphi < \tilde{\phi}_{\tilde{l}+1} \end{cases}$$

Figure 14A:
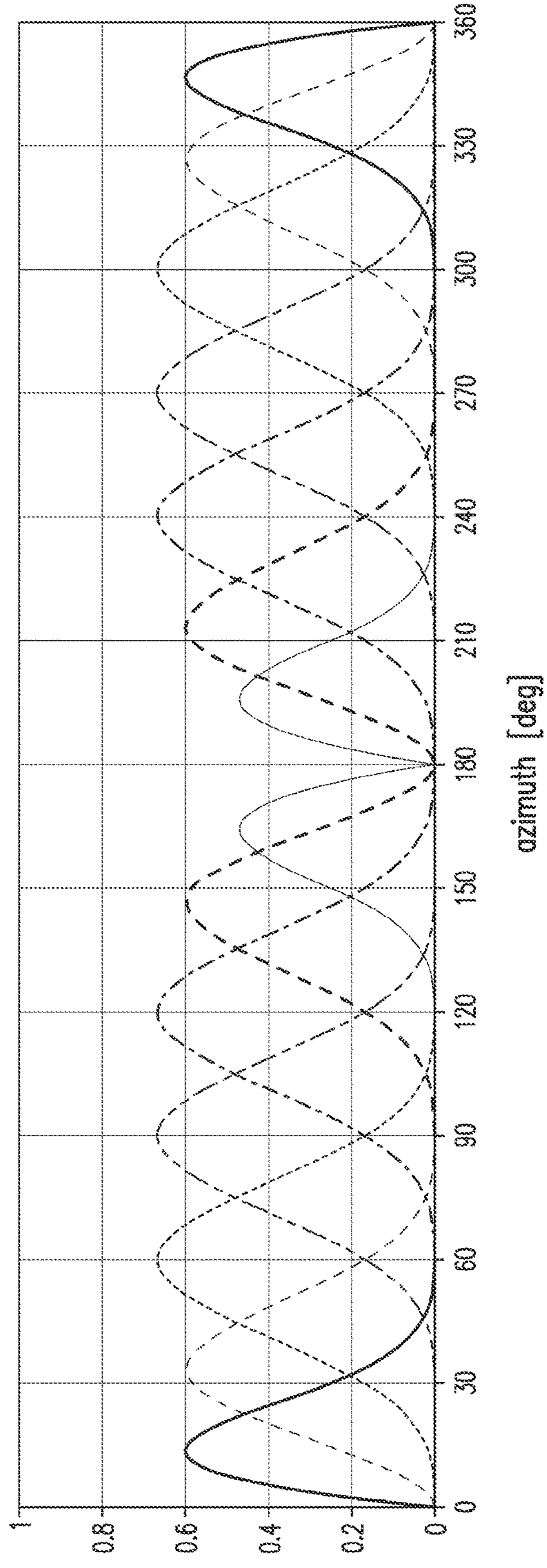
FIG. 14A illustrates another example of B-spline basis functions.

An example of the B-spline basis functions for the azimuth angle of degree 3 initially evaluated using the knot sequence $\tilde{\phi}=(0, 30, \ldots, 150, 180)$ and the multiplicity sequence m=(3, 1, . . . , 1, 2) is illustrated in FIG. 14A.

Figure 14B:
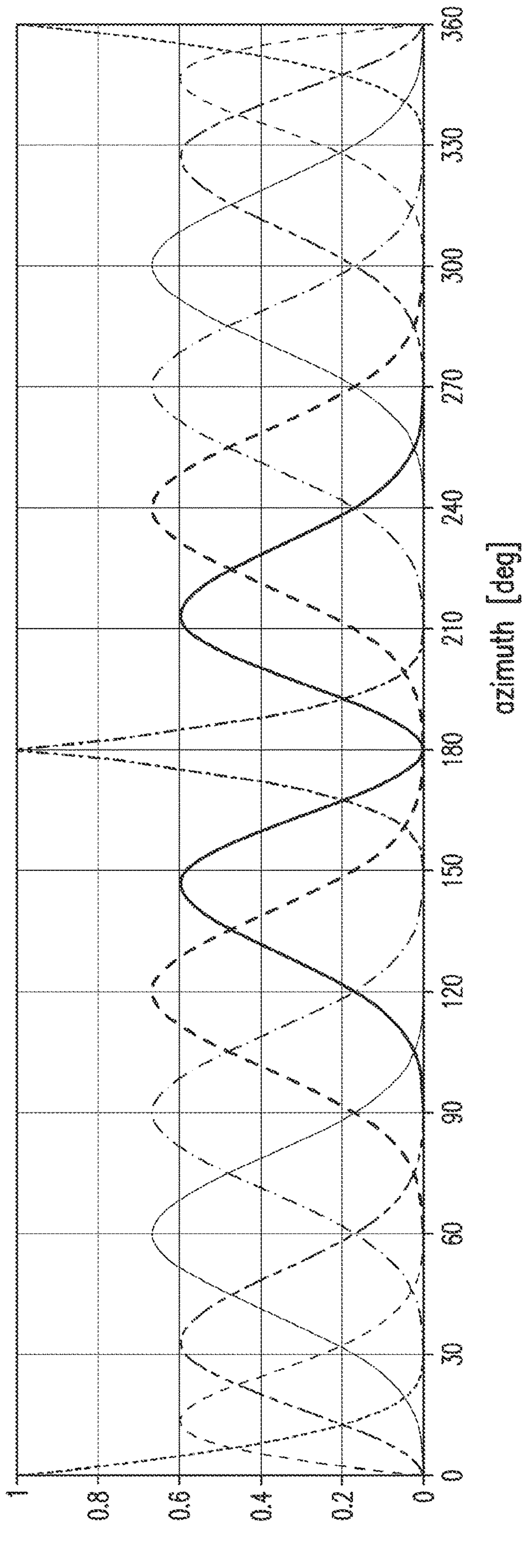
FIG. 14B illustrates a standard B-spline basis functions without smoothness condition at the knot-points 0/180 degrees.

Considering that the ITD may not be exactly zero at azimuths 0/180/360 degrees, a standard B-spline basis functions without smoothness condition at the knot-points 0/180 degrees may be used. An example of such basis functions is illustrated in FIG. 14B.

1.4 Model Representation

Figure 15:
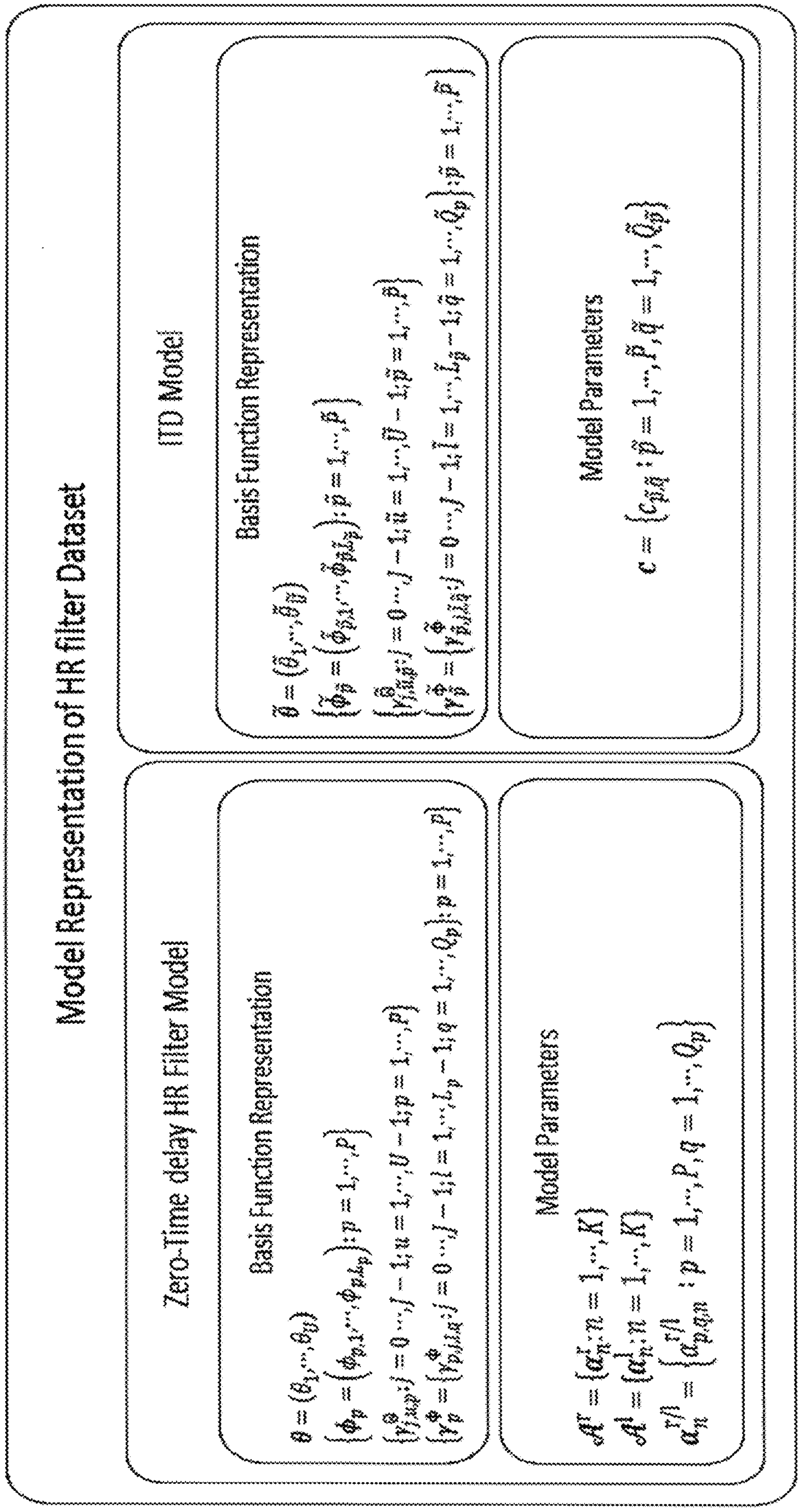
FIG. 15 illustrates a model representation of an HR filter dataset according to one embodiment.

FIG. 15 illustrates a model representation of an HR filter dataset. The representation consists of one zero-time delay HR filter model representation and one ITD model representation with each composed of basis functions and model parameters. The key to the modeling accuracy and computational efficiency of the modeling solution is the carefully constructed set of B-spline basis functions used to model the angular variation of the HR filter set, which are simple enough to give good computational efficiency but rich enough to give good modeling accuracy.

For the zero-delay HR filter model, there are P elevation B-spline basis functions, P sets of azimuth B-spline basis functions with each containing $Q_p$ functions, and two sets of model parameters with each a $\Sigma_{p=1}^{P} Q_p$ by K matrix. For the ITD model, there are $\tilde{P}$ elevation B-spline basis functions, $\tilde{P}$ set of azimuth B-spline basis functions with each containing $\tilde{Q}_{\tilde{p}}$ functions, and one set of model parameters which is a vector with $\Sigma_{\tilde{p}=1}^{\tilde{P}} \tilde{Q}_{\tilde{p}}$ elements.

Each set of B-spline basis functions are represented by the knot sequences and the polynomial model coefficients γ, which is a three-dimensional array. The first dimension corresponds to the order of the B-Spline, the second dimension corresponds to the number of knot-point intervals, and the third dimension corresponds to the number of basis functions.

P or $\tilde{P}$ is much smaller than the number of elevation angles in the original HR filter dataset. Q or $\tilde{Q}$ is much smaller than the number of azimuth angles in the dataset. K is also smaller than the length or the number of frequency bins of the original filter. Therefore, the model representation is efficient in representing an HR filter dataset.

Moreover, since the angular basis functions are continuous, the model representation can be used to generate a pair of HR filters at any arbitrary location specified by elevation and azimuth.

2. HR Filter Generation

Figure 16:
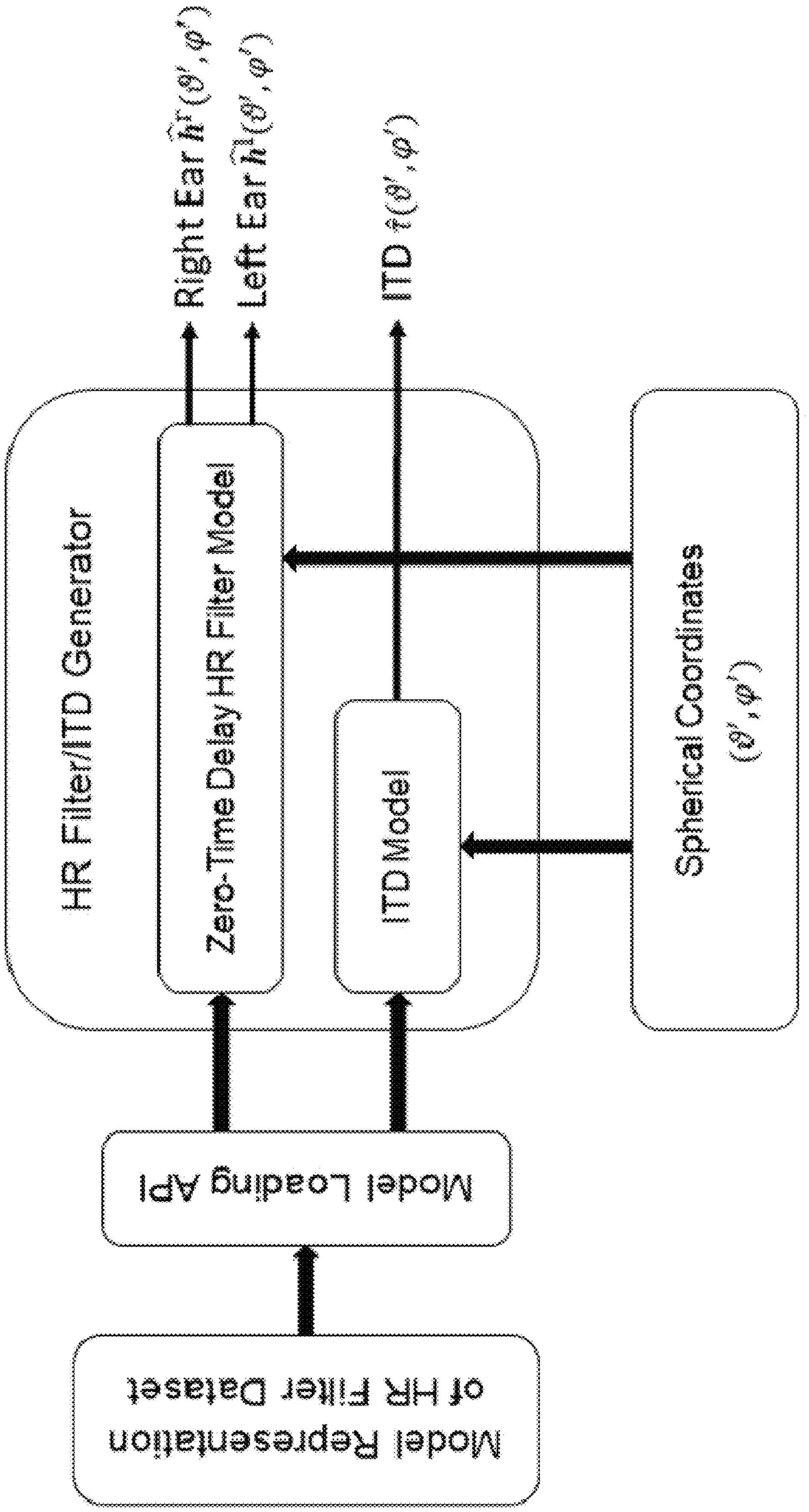
FIG. 16 is a block diagram of a system, according to one embodiment, for generating a pair of zero-time delay HR filters and the corresponding ITD.

FIG. 16 is a block diagram of a system for generating a pair of zero-time delay HR filters (i.e., a right ear filter and a left hear filter) and the corresponding ITD given the model representation. The model representation may be written in a binary file or a text file. It is loaded via an API to retrieve the model structure. How to use the model representation to obtain a pair of HR filters and the ITD at a specified location is described below.

2.1 Generate Zero-Time Delay HR Filter

Figure 17:
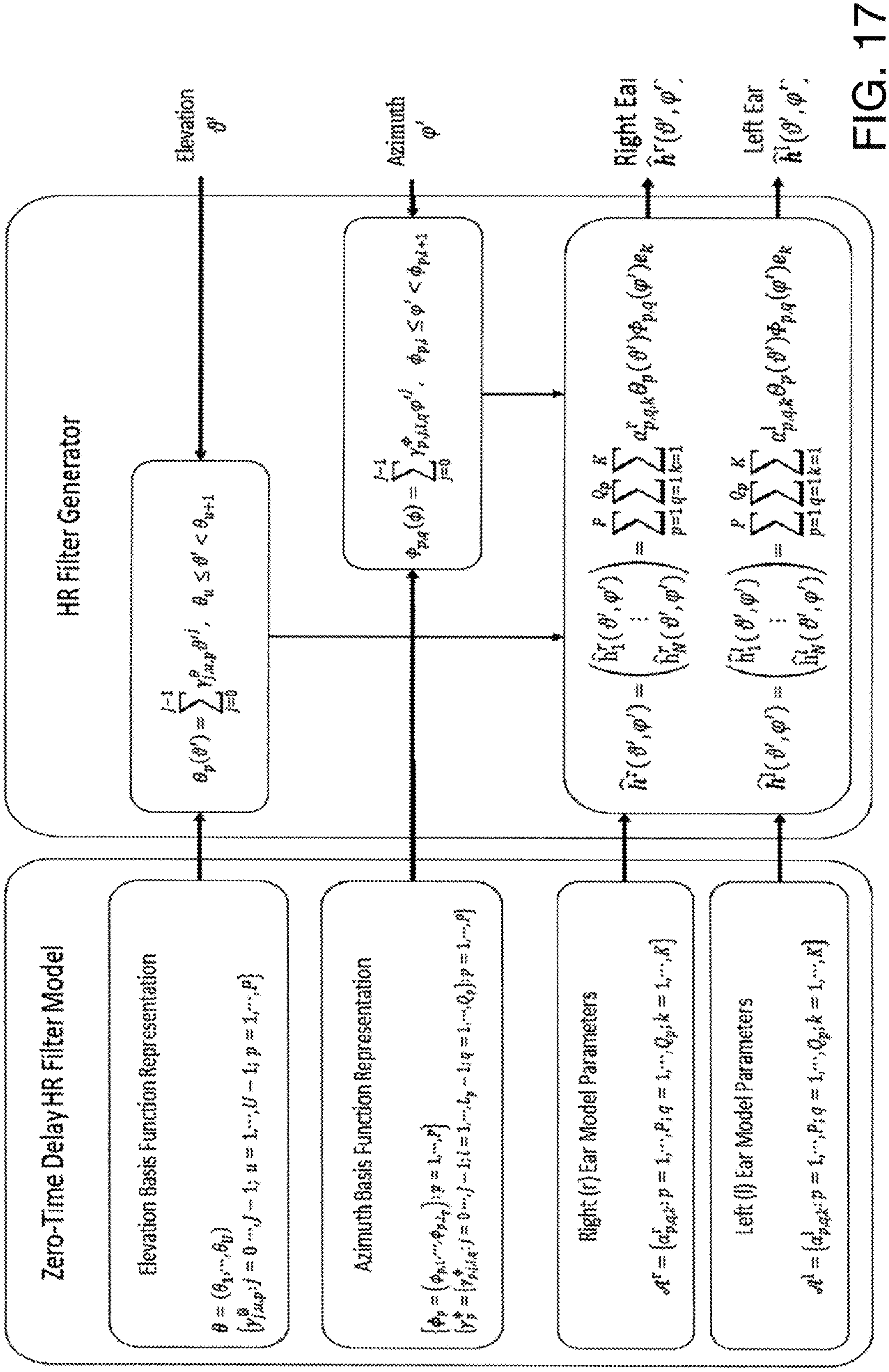
FIG. 17 illustrates a process, according to one embodiment, for generating a pair of zero-time delay HR filters at a location ($\vartheta'$, $\varphi'$) given an HR filter model representation.

FIG. 17 illustrates a process for generating a pair of zero-time delay HR filters at a location (ϑ', φ') given the HR filter model representation. As explained in Section 1.2.2 the model of the set of elevation B-spline basis functions $\{\Theta_p: p=1, \ldots, P\}$ comprises a knot sequence $\theta=(\theta_1, \ldots, \theta_U)$ that specifies the sub-intervals $\{\theta_u \le \vartheta \le \theta_{u+1}: u=1, \ldots, U-1\}$ over which the functions are polynomials and a 3-dim array of model parameters $\{\gamma_{j,u,p}^{\Theta}: j=0, \ldots, J-1; u=1, \ldots, U-1; p=1, \ldots, P\}$, The steps involved in evaluating the values of the P elevation basis functions at the elevation angle ϑ', $\{\Theta_p(\vartheta'): p=1, \ldots, P\}$, are the following:

(1) Find the index u for which $\theta_u \le \vartheta' \le \theta_{u+1}$; and (2) Evaluate the value of the p-th elevation B-spline basis function at the elevation angle ϑ' as:

$$\Theta_p(\vartheta') = \sum_{j=0}^{J-1} \gamma^{\Theta}_{j,u,p} \vartheta'^j.$$

A similar procedure is used to evaluate the values of the sets of azimuth B-spline basis functions $\{\Phi_{p,q}(\varphi'): q=1, \ldots, Q_p\}$ for p=1, . . . , P at a given azimuth angle φ'.

Once these sets of basis function values are obtained, the right ear zero-time delay HR filter at a location (ϑ', φ') are obtained as follows:

$$\hat{h}^r(\vartheta', \varphi') = \begin{pmatrix} \hat{h}_1^r(\vartheta', \varphi') \\ \vdots \\ \hat{h}_N^r(\vartheta', \varphi') \end{pmatrix} = \sum_{p=1}^{P} \sum_{q=1}^{Q_p} \sum_{k=1}^{K} \alpha^r_{p,q,k} \Theta_p(\vartheta') \Phi_{p,q}(\varphi') e_k.$$

From this it is also clear that the evaluation of $\hat{h}_k^r(\vartheta', \varphi')$ is obtained as:

$$\hat{h}_k^r(\vartheta', \varphi') = \sum_{p=1}^{P} \sum_{q=1}^{Q_p} \alpha^r_{p,q,k} \Theta_p(\vartheta') \Phi_{p,q}(\varphi').$$

The left ear zero-time delay HR filter at a location (ϑ', φ') is obtained as follows:

$$\hat{h}^l(\vartheta', \varphi') = \begin{pmatrix} \hat{h}_1^l(\vartheta', \varphi') \\ \vdots \\ \hat{h}_N^l(\vartheta', \varphi') \end{pmatrix} = \sum_{p=1}^{P} \sum_{q=1}^{Q_p} \sum_{k=1}^{K} \alpha^l_{p,q,k} \Theta_p(\vartheta') \Phi_{p,q}(\varphi') e_k.$$

The evaluation of $\hat{h}_k^l(\vartheta', \varphi')$ is obtained as $$\hat{h}_k^1(\vartheta', \varphi') = \sum_{p=1}^{P} \sum_{q=1}^{Q_p} \alpha^1_{p,q,k} \Theta_p(\vartheta') \Phi_{p,q}(\varphi').$$

2.2 Generate ITD

Figure 18:
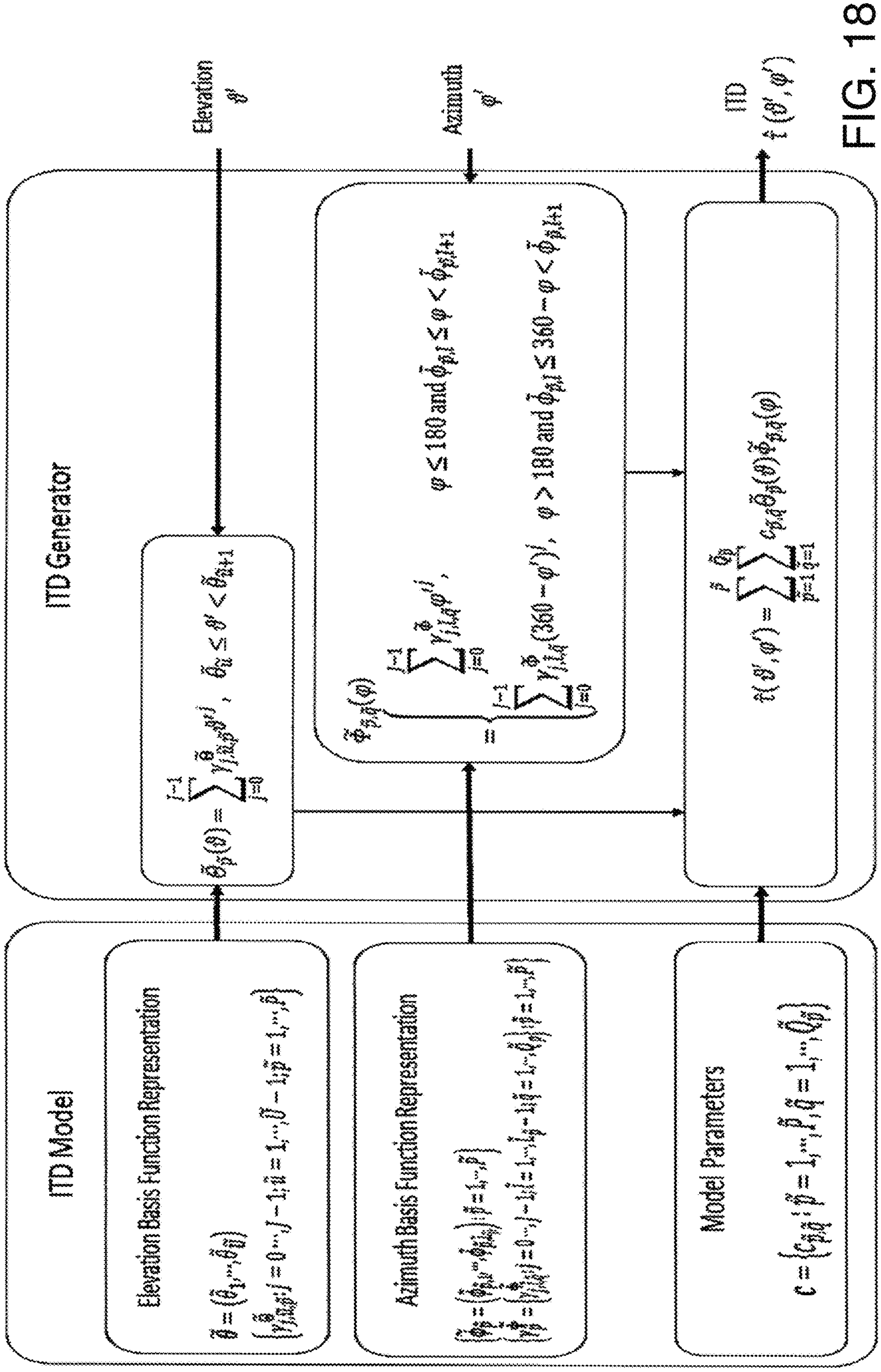
FIG. 18 illustrates a process, according to one embodiment, for generating ITD at a location ($\vartheta'$, $\varphi'$) given the ITD model representation

FIG. 18 illustrates a process, according to one embodiment, for generating ITD at a location $(\vartheta', \varphi')$ given the ITD model representation.

Following the procedure described in subsection 2.1, the values of the $\tilde{P}$ elevation basis functions at the elevation angle $\vartheta'$ and the values of the sets of azimuth B-spline basis functions $\{\tilde{\Phi}_{\tilde{p},\tilde{q}}(\varphi')\colon \tilde{q}=1, \ldots, \tilde{Q}_{\tilde{p}}\}$ for $\tilde{p}=1, \ldots, \tilde{P}$ at a given azimuth angle $\varphi'$ are evaluated, respectively. Once the values of the elevation and azimuth basis functions are evaluated, the ITD is obtained as:

$$\hat{\tau}(\vartheta', \varphi') = \sum_{\tilde{p}=1}^{\tilde{P}} \sum_{\tilde{q}=1}^{\tilde{Q}_{\tilde{p}}} c_{\tilde{p},\tilde{q}} \tilde{\Theta}_{\tilde{p}}(\vartheta') \tilde{\Phi}_{\tilde{p},\tilde{q}}(\varphi').$$

As mentioned in subsection 5.1.1, we model the HR filter sets as the combination of a minimum phase-like system and a pure delay line. The delay for the right ear HR filter is:

$$\hat{\tau}_r(\vartheta', \varphi') = \begin{cases} 0 & \hat{\tau}(\vartheta', \varphi') \le 0 \\ \hat{\tau}(\vartheta', \varphi') & \hat{\tau}(\vartheta', \varphi') > 0 \end{cases}.$$

The delay for the left ear HR filter is $$\hat{\tau}_l(\vartheta', \varphi') = \begin{cases} |\hat{\tau}(\vartheta', \varphi')| & \hat{\tau}(\vartheta', \varphi') < 0 \\ 0 & \hat{\tau}(\vartheta', \varphi') \ge 0 \end{cases}.$$

Note that the calculation of $\hat{\tau}_r(\vartheta', \varphi')$ and $\hat{\tau}_l(\vartheta', \varphi')$ should be consistent with the definition of ITD and the coordinate system used.

Figure 19:
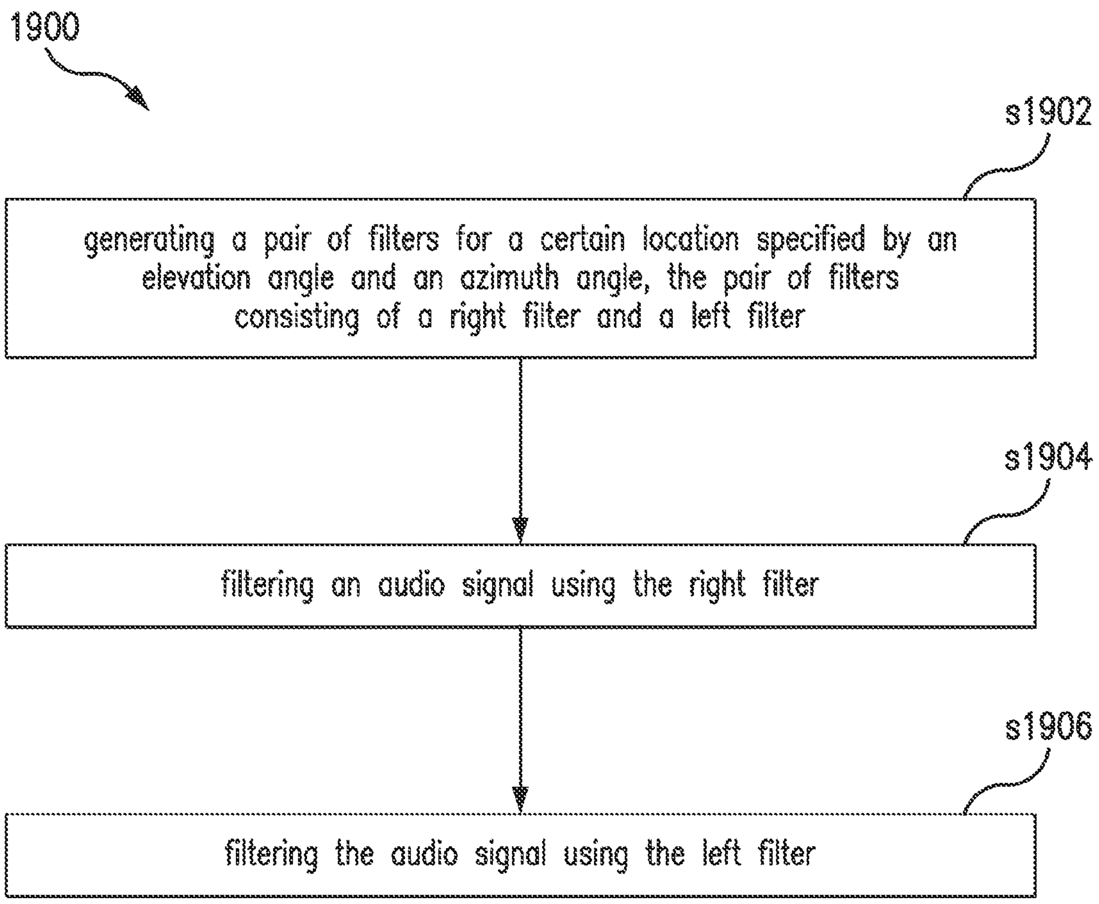
FIG. 19 is a flowchart illustrating a process according to an embodiment.

FIG. 19 is a flowchart illustrating a process 1900 according to an embodiment. Process 1900 may begin in step s 1902.

Step s1902 comprises generating a pair of filters for a certain location specified by an elevation angle $\vartheta$ and an azimuth angle $\varphi$, the pair of filters consisting of a right filter $(\hat{h}^r(\vartheta, \varphi))$ and a left filter $(\hat{h}^l(\vartheta, \varphi))$.

Step s1904 comprises filtering an audio signal using the right filter.

Step s1906 comprises filtering the audio signal using the left filter.

Figure 20:
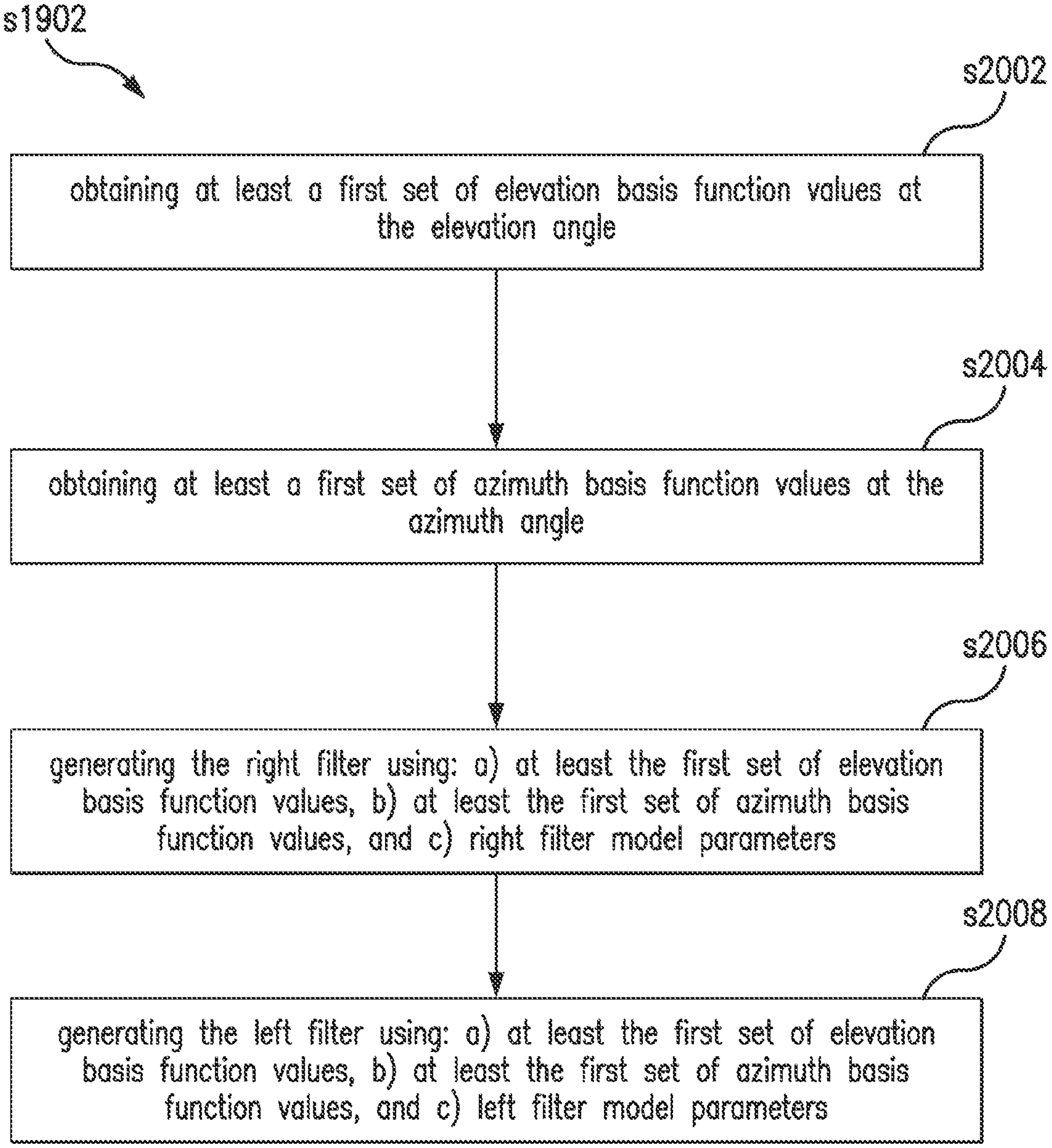
FIG. 20 is a flowchart illustrating a process according to an embodiment.

As shown in FIG. 20, step s1902 comprises: i) obtaining at least a first set of elevation basis function values at the elevation angle (step s2002); ii) obtaining at least a first set of azimuth basis function values at the azimuth angle (steps 2004); iii) generating the right filter using: a) at least the first set of elevation basis function values, b) at least the first set of azimuth basis function values, and c) right filter model parameters (step s2006); and iv) generating the left filter using: a) at least the first set of elevation basis function values, b) at least the first set of azimuth basis function values, and c) left filter model parameters (step s2008).

In some embodiments, obtaining the first set of azimuth basis function values comprises obtaining P sets of azimuth basis function values, wherein the P sets of azimuth basis function values comprises the first set of azimuth basis function values, $\hat{h}^r(\vartheta, \varphi)=\Sigma_{p=1}^{P} \Sigma_{q=1}^{Q_p} \Sigma_{k=1}^{K} \alpha_{p,q,k}^{r}\Theta_p(\vartheta)\Phi_{p,q}(\varphi)e_k$, and $\hat{h}^l(\vartheta, \varphi)\ \Sigma_{p=1}^{P} \Sigma_{q=1}^{Q_p} \Sigma_{k=1}^{K} \alpha_{p,q,k}^{l}\Theta_p(\vartheta)\Phi_{p,q}(\varphi)e_k$, where $\alpha_{p,q,k}^{l}$ for p=1 to P, q=1 to $Q_p$, and k=1 to K is a set of left model parameters, $\alpha_{p,q,k}^{r}$ for p=1 to P, q=1 to $Q_p$, and k=1 to K is a set of right model parameters, $\Theta_p(\vartheta)$ for p=1 to P defines the first set of elevation basis function values at the elevation angle $\vartheta$, and $\Phi_{p,q}(\varphi)$ for p=1 to P and q=1 to $Q_p$ defines the P sets of azimuth basis function values at the azimuth angle $\varphi$; and $e_k$ for k=1 to K is a set of canonical orthonormal basis vectors of length N.

In some embodiments, obtaining the first set of elevation basis function values comprises obtaining Q sets of elevation basis function values, wherein the Q sets of elevation basis function values comprises the first set of elevation basis function values, $\hat{h}^r(\vartheta, \varphi)=\Sigma_{q=1}^{Q} \Sigma_{p=1}^{P_q} \Sigma_{k=1}^{K} \alpha_{p,q,k}^{r}\Theta_{q,p}(\vartheta)\Phi_q(\varphi)e_k$, and $\hat{h}^l(\vartheta, \varphi)=\Sigma_{q=1}^{Q} \Sigma_{p=1}^{P_q} \Sigma_{k=1}^{K} \alpha_{p,q,k}^{l}\Theta_{q,p}(\vartheta)\Phi_q(\varphi)e_k$, where $\alpha_{p,q,k}^{l}$ for p=1 to $P_q$, q=1 to Q, and k=1 to K is a set of left model parameters, $\alpha_{p,q,k}^{r}$ for p=1 to $P_q$, q=1 to Q, and k=1 to K is a set of right model parameters, $\Theta_{q,p}(\vartheta)$ for q=1 to Q and p=1 to $P_q$ defines the Q sets of elevation basis function values at the elevation angle $\vartheta$, and $\Phi_q(\varphi)$ for q=1 to Q defines the first set of azimuth basis function values at the azimuth angle $\varphi$; and $e_k$ for k=1 to K is a set of canonical orthonormal basis vectors of length N.

In some embodiments, obtaining the first set of elevation basis function values comprises, for each elevation basis function included in a first set of elevation basis functions, evaluating the elevation basis function at the elevation angle to produce an elevation basis function value corresponding to the elevation angle and the elevation basis function, and obtaining the first set of azimuth basis function values comprises, for each azimuth basis function included in a first set of azimuth basis functions, evaluating the azimuth basis function at the azimuth angle to produce an azimuth basis function value corresponding to the azimuth angle and the azimuth basis function.

In some embodiments, each of the elevation basis functions included in the first set of elevation basis functions is a b-spline basis function, and each of the azimuth basis functions included in the first set of azimuth basis functions is a periodic b-spline basis function.

In some embodiments, the process also includes obtaining a model that represents at least the first set of elevation basis functions, wherein the model comprises: a sequence $(\theta)$, where $\theta=(\theta_1, \ldots, \theta_U)$, that specifies sub-intervals $\{\theta_u \le \vartheta \le \theta_{u+1}\colon u=1, \ldots, U-1\}$ over which the elevation basis functions are polynomials, and a three-dimensional array of model parameters $(\{\gamma_{j,u,p}^{\Theta}\colon j=0, \ldots, J-1; u=1, \ldots, U-1; p=1, \ldots, P\})$.

In some embodiments, the first set of elevation basis functions comprises a p-th elevation basis function, evaluating each elevation basis function included in the first set of elevation basis functions at the elevation angle $\vartheta$ comprises evaluating the p-th elevation basis function at the elevation angle $\vartheta$, and evaluating the p-th elevation basis function at the elevation angle $\vartheta$ comprises the following steps: finding an index u for which $\omega_u \le \vartheta \le \theta_{u+1}$; and evaluating the value of the p-th elevation basis function at the elevation angle $\vartheta$ as $\Theta_p(\vartheta)=\Sigma_{j=0}^{J-1}\gamma_{j,u,p}^{\Theta}\vartheta_j$.

In some embodiments the process also includes obtaining a model that represents at least the first set of azimuth basis functions, wherein the model comprises: a sequence $(\phi_1)$, where $\phi_1=(\phi_{1,1}, \ldots, \phi_{1,L_1})$, that specifies sub-intervals $\{\phi_{1,l} \le \varphi \le_{1,l+1}\colon l=1, \ldots, L_1-1\}$ over which the azimuth basis functions are polynomials, and a three-dimensional array of model parameters $(\gamma_1^{\Phi}=\{\gamma_{1,j,l,q}^{\Phi}\colon j=0 \ldots, J-1; l=1, \ldots, L_1-1; q=1, \ldots, Q_1\})$.

In some embodiments, the first set of azimuth basis functions comprises a q-th azimuth basis function, evaluating each azimuth basis function included in the first set of azimuth basis functions at the azimuth angle $\vartheta$ comprises evaluating the q-th azimuth basis function at the azimuth angle $\vartheta$, and evaluating the q-th azimuth basis function at the azimuth angle $\varphi$ comprises the following steps: finding an index l for which $\phi_{1,l} \leq \varphi \leq \phi_{1,l+1}$; and evaluating the value of the q-th azimuth basis function at the azimuth angle $\varphi$ as $\Phi_{1,q}(\phi)=\Sigma_{j=0}^{J-1}\gamma_{1,j,l,q}^{\Phi}\varphi^{j}$.

In some embodiments the process also includes generating at least the first set of azimuth basis functions, wherein generating the first set of azimuth basis functions comprises generating a set of periodic B-spline basis functions over an azimuth range 0 to 360 degrees. In some embodiments, generating the set of periodic B-spline basis functions over an azimuth range 0 to 360 degrees comprises: specifying a knot sequence of length L over a range 0 to 360 degrees; generating an extended knot sequence based on the knot sequence of length L, wherein generating the extended knot sequence comprises extending the knot sequence of length L in a periodic manner with J values below 0 degrees and J−1 values above 360 degrees; obtaining an extended multiplicity sequence of ones; using the extended knot sequence and the extended multiplicity sequence to generate a set of extended B-spline basis functions; choosing the L−1 consecutive of those extended basis functions starting at index 2; and mapping the chosen extended basis functions in a periodic fashion to the azimuth range of 0 to 360 degrees.

In some embodiments the process also includes determining an Interaural Time Difference ($\hat{\tau}(\vartheta, \varphi)$) for the elevation-azimuth angle $(\vartheta, \varphi)$. In some embodiment the process also includes determining a right delay $\hat{\tau}_r(\vartheta, \varphi)$ based on $\hat{\tau}(\vartheta, \varphi)$; and determining a left delay $\hat{\tau}_l(\vartheta, \varphi)$ based on $\hat{\tau}_r(\vartheta, \varphi)$. In some embodiments, filtering the audio signal using the right filter comprises filtering the audio signal using the right filter and the right delay $\hat{\tau}_r(\vartheta, \varphi)$; an filtering the audio signal using the left filter comprises filtering the audio signal using the left filter and the left delay $\hat{\tau}_l(\vartheta, \varphi)$. In some embodiments, filtering the audio signal using the right filter and $\hat{\tau}_r(\vartheta, \varphi)$ comprises calculating: $\hat{h}^r(\vartheta, \varphi)*u(n-\hat{\tau}_r(\vartheta, \varphi))$ filtering the audio signal using the left filter and $\hat{\tau}_l(\vartheta, \varphi)$ comprises calculating: $\hat{h}^l(\vartheta, \varphi)*u(n-\hat{\tau}_l(\vartheta, \varphi))$, where u(n) is the audio signal.

In some embodiments, $$\hat{\tau}_r(\vartheta, \varphi) = \begin{cases} 0 & \hat{\tau}(\vartheta', \varphi') \leq 0 \\ \hat{\tau}(\vartheta', \varphi') & \hat{\tau}(\vartheta', \varphi') > 0 \end{cases}; \text{ and}$$

$$\hat{\tau}_l(\vartheta, \varphi) = \begin{cases} |\hat{\tau}(\vartheta', \varphi')| & \hat{\tau}(\vartheta', \varphi') < 0 \\ 0 & \hat{\tau}(\vartheta', \varphi') \geq 0 \end{cases}.$$

Figure 21:
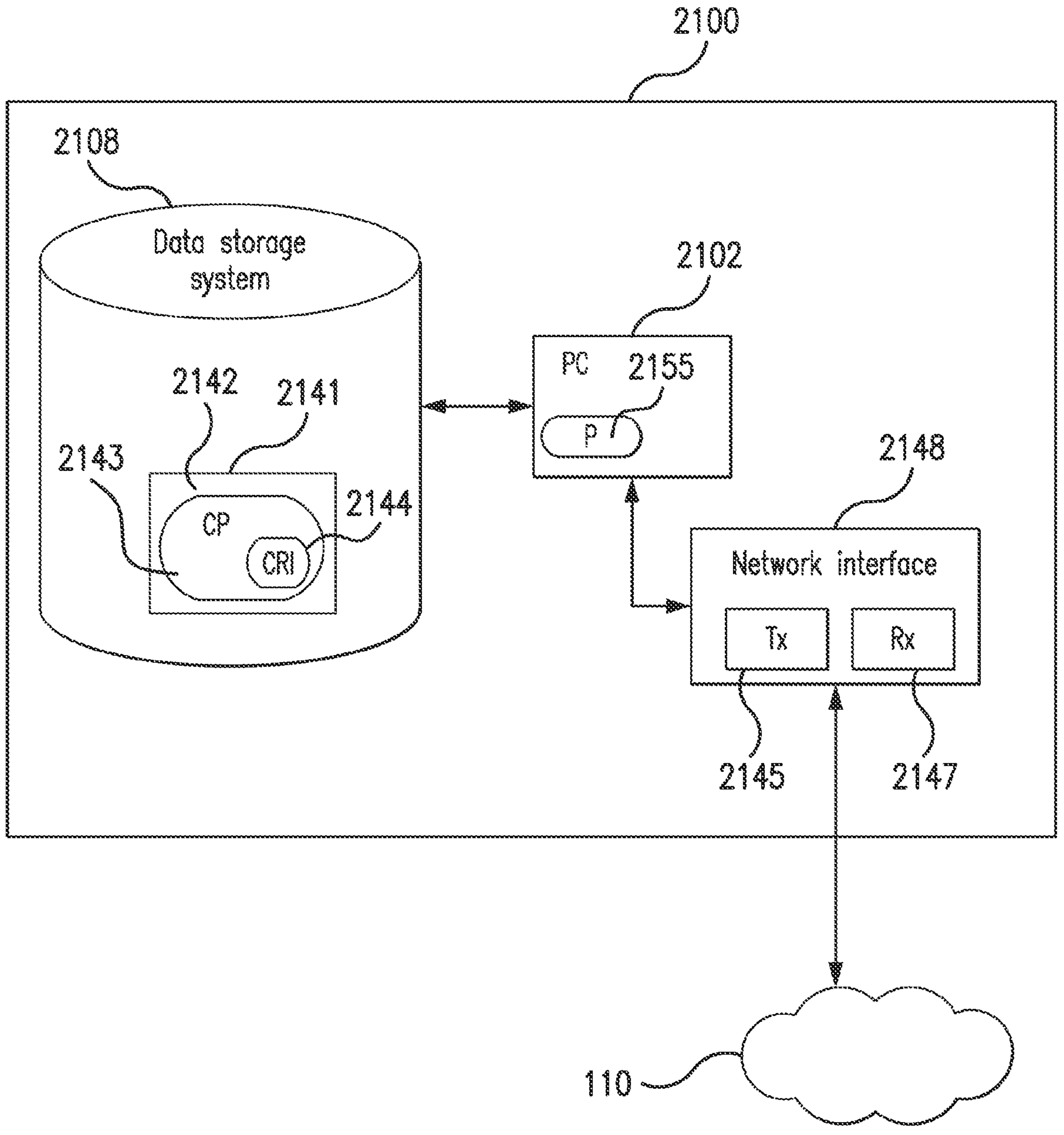
FIG. 21 is a block diagram of an HR filtering apparatus 2100, according to one embodiment.

FIG. 21 is a block diagram of an HR filtering apparatus 2100, according to some embodiments, for implementing HR filtering unit 400. That is, apparatus 2100 is operative to perform the processes disclosed herein. As shown in FIG. 21, apparatus 2100 may comprise: processing circuitry (PC) 2102, which may include one or more processors (P) 2155 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 2100 may be a distributed computing apparatus); a network interface 2148 comprising a transmitter (Tx) 2145 and a receiver (Rx) 2147 for enabling apparatus 2100 to transmit data to and receive data from other nodes connected to a network 110 (e.g., an Internet Protocol (IP) network) to which network interface 2148 is connected (directly or indirectly) (e.g., network interface 2148 may be wirelessly connected to the network 110, in which case network interface 2148 is connected to an antenna arrangement); and a local storage unit (a.k.a., "data storage system") 2108, which may include one or more non-volatile storage devices and/or one or more volatile storage devices. In embodiments where PC 2102 includes a programmable processor, a computer program product (CPP) 2141 may be provided. CPP 2141 includes a computer readable medium (CRM) 2142 storing a computer program (CP) 2143 comprising computer readable instructions (CRI) 2144. CRM 2142 may be a non-transitory computer readable medium, such as, magnetic media (e.g., a hard disk), optical media, memory devices (e.g., random access memory, flash memory), and the like. In some embodiments, the CRI 2144 of computer program 2143 is configured such that when executed by PC 2102, the CRI causes apparatus 2100 to perform steps described herein (e.g., steps described herein with reference to the flow charts). In other embodiments, apparatus 2100 may be configured to perform steps described herein without the need for code. That is, for example, PC 2102 may consist merely of one or more ASICs. Hence, the features of the embodiments described herein may be implemented in hardware and/or software.

The following is a summary of various embodiments described herein:

A1. A method for audio signal filtering, the method comprising: generating a pair of filters for a certain location specified by an elevation angle $\vartheta$ and an azimuth angle $\varphi$, the pair of filters consisting of a right filter ($\hat{h}^r(\vartheta, \varphi)$) and a left filter ($\hat{h}^l(\vartheta, \varphi)$); filtering an audio signal using the right filter; and filtering the audio signal using the left filter, wherein generating the pair of filters comprises: i) obtaining at least a first set of elevation basis function values at the elevation angle; ii) obtaining at least a first set of azimuth basis function values at the azimuth angle; iii) generating the right filter using: a) at least the first set of elevation basis function values, b) at least the first set of azimuth basis function values, and c) right filter model parameters; and iv) generating the left filter using: a) at least the first set of elevation basis function values, b) at least the first set of azimuth basis function values, and c) left filter model parameters.

A2. The method of claim A1, wherein obtaining the first set of azimuth basis function values comprises obtaining P sets of azimuth basis function values, wherein the P sets of azimuth basis function values comprises the first set of azimuth basis function values.

A3. The method of claim A1, wherein generating the right filter comprises calculating: $\hat{h}^r(\vartheta, \varphi)=\Sigma_{p=1}^{P} \Sigma_{q=1}^{Q_p} \Sigma_{k=1}^{K} \alpha_{p,q,k}^{r}\Theta_p(\vartheta)\Phi_{p,q}(\varphi)e_k$, and generating the left filter comprises calculating: $\hat{h}^l(\vartheta, \varphi)=\Sigma_{p=1}^{P} \Sigma_{q=1}^{Q_p} \Sigma_{k=1}^{K} \alpha_{p,q,k}^{l}\Theta_p(\vartheta)\Phi_{p,q}(\varphi)e_k$, where $\alpha_{p,q,k}^{r}$ for p=1 to P, q=1 to $Q_p$, and k=1 to K is a set of right model parameters, $\alpha_{p,q,k}^{l}$ for p=1 to P, q=1 to $Q_p$, and k=1 to K is a set of left model parameters, $\Theta_p(\vartheta)$ for p=1 to P defines the first set of elevation basis function values at the elevation angle $\vartheta$, and $\Phi_{p,q}(\varphi)$ for p=1 to P and q=1 to $Q_p$ defines P sets of azimuth basis function values at the azimuth angle $\varphi$; and $e_k$ for k=1 to K is a set of canonical orthonormal basis vectors of length N.

A4. The method of claim A1, wherein obtaining the first set of elevation basis function values comprises obtaining Q sets of elevation basis function values, wherein the Q sets of elevation basis function values comprises the first set of elevation basis function values.

A5. The method of claim A1, wherein generating the right filter comprises calculating: $\hat{h}^r(\vartheta, \varphi)=\Sigma_{q=1}^{Q} \Sigma_{p=1}^{P_q} \Sigma_{k=1}^{K} \alpha_{p,q,k}^{r}\Theta_{q,p}(\vartheta)\Phi_q(\varphi)e_k$, and generating the left filter comprises calculating: $\hat{h}^l(\vartheta, \varphi)=\Sigma_{q=1}^{Q} \Sigma_{p=1}^{P_q} \Sigma_{k=1}^{K} \alpha_{p,q,k}^{l}\Theta_{q,p}(\vartheta)\Phi_q(\varphi)e_k$, where $\alpha_{p,q,k}^{r}$ for p=1 to $P_q$, q=1 to Q, and k=1 to K is a set of right model parameters, $\alpha_{p,q,k}^{l}$ for p=1 to $P_q$, q=1 to Q, and k=1 to K is a set of left model parameters, $\Theta_{q,p}(\vartheta)$ for q=1 to Q and p=1 to $P_q$ defines Q sets of elevation basis function values at the elevation angle $\vartheta$, and $\Phi_q(\varphi)$ for q=1 to Q defines the first set of azimuth basis function values at the azimuth angle $\varphi$; and $e_k$ for k=1 to K is a set of canonical orthonormal basis vectors of length N.

A6. The method of any one of claims A1-A5, wherein each said elevation basis function value is dependent on the azimuth angle, and/or each said azimuth basis function value is dependent on the elevation angle.

A7. The method of any one of claims A1-A5, wherein obtaining the first set of elevation basis function values comprises, for each elevation basis function included in a first set of elevation basis functions, evaluating the elevation basis function at the elevation angle to produce an elevation basis function value corresponding to the elevation angle and the elevation basis function, and obtaining the first set of azimuth basis function values comprises, for each azimuth basis function included in a first set of azimuth basis functions, evaluating the azimuth basis function at the azimuth angle to produce an azimuth basis function value corresponding to the azimuth angle and the azimuth basis function.

A8. The method of claim A7, wherein each of the elevation basis functions included in the first set of elevation basis functions is a B-spline basis function, and each of the azimuth basis functions included in the first set of azimuth basis functions is a periodic b-spline basis function.

A9. The method of claim A7 or A8, further comprising obtaining a model that represents at least the first set of elevation basis functions, wherein the model comprises: a sequence ($\theta$), where $\theta=(\theta_1, \ldots, \theta_U)$, that specifies sub-intervals $\{\theta_u \leq \vartheta \leq \theta_{u+1}: u=1, \ldots, U-1\}$ over which the elevation basis functions are polynomials, and a three-dimensional array of model parameters ($\{\gamma_{j,u,p}^{\Theta}: j=0, \ldots, J-1; u=1, \ldots, U-1; p=1, \ldots, P\}$).

A10. The method of claim A9, wherein the first set of elevation basis functions comprises a p-th elevation basis function, evaluating each elevation basis function included in the first set of elevation basis functions at the elevation angle $\vartheta$ comprises evaluating the p-th elevation basis function at the elevation angle $\vartheta$, and evaluating the p-th elevation basis function at the elevation angle $\vartheta$ comprises the following steps: finding an index u for which $\theta_u \leq \vartheta \leq \theta_{u+1}$; and evaluating the value of the p-th elevation basis function at the elevation angle $\vartheta$ as $\Theta_p(\vartheta)=\Sigma_{j=0}^{J-1}\gamma_{j,u,p}^{\Theta}\vartheta^j$.

A11. The method of claim A7 or A8, further comprising obtaining a model that represents at least the first set of azimuth basis functions, wherein the model comprises: a sequence ($\phi_1$), where $\phi_1=(\phi_{1,1}, \ldots, \phi_{1,L_1})$, that specifies sub-intervals $\{\phi_{1,l} \leq \varphi \leq \phi_{1,l+1}: l=1, \ldots, L_1-1\}$ over which the azimuth basis functions are polynomials, and a three-dimensional array of model parameters ($\gamma_1^{\Phi}=\{\gamma_{1,j,l,q}^{\Phi}: j=0 \ldots, J-1; l=1, \ldots, L_1-1; q=1, \ldots, Q_1\}$).

A12. The method of claim A11, wherein the first set of azimuth basis functions comprises a q-th azimuth basis function, evaluating each azimuth basis function included in the first set of azimuth basis functions at the azimuth angle $\vartheta$ comprises evaluating the q-th azimuth basis function at the azimuth angle $\vartheta$, and evaluating the q-th azimuth basis function at the azimuth angle $\varphi$ comprises the following steps: finding an index l for which $\phi_{1,l} \leq \varphi \leq \phi_{1,l+1}$; and evaluating the value of the q-th azimuth basis function at the azimuth angle $\varphi$ as $\Phi_{1,q}(\varphi)=\Sigma_{j=0}^{J-1}\gamma_{1,j,l,q}^{\Phi}\varphi^j$.

A13. The method of any one of claims A7-A12, wherein the step of obtaining the first set of azimuth basis function values further comprises generating the first set of azimuth basis functions.

A14. The method of claim A13, wherein generating the first set of azimuth basis functions comprises generating a set of periodic B-spline basis functions over an azimuth range 0 to 360 degrees.

A15. The method of claim A14, wherein generating the set of periodic B-spline basis functions over an azimuth range 0 to 360 degrees comprises: specifying a knot sequence of length L over a range 0 to 360 degrees; generating an extended knot sequence based on the knot sequence of length L, wherein generating the extended knot sequence comprises extending the knot sequence of length L in a periodic manner with l values below 0 degrees and J−1 values above 360 degrees; obtaining an extended multiplicity sequence of ones; using the extended knot sequence and the extended multiplicity sequence to generate a set of extended B-spline basis functions; choosing the L−1 consecutive of those extended basis functions starting at index 2; and mapping the chosen extended basis functions in a periodic fashion to the azimuth range of 0 to 360 degrees.

A16. The method of any one of claims A1-A15, further comprising determining an Interaural Time Difference ($\hat{\tau}(\vartheta, \varphi)$) for the elevation-azimuth angle ($\vartheta, \varphi$).

A17. The method of claim A16, further comprising: determining a right delay $\hat{\tau}_r(\vartheta, \varphi)$ based on $\hat{\tau}(\vartheta, \varphi)$; and determining a left delay $\hat{\tau}_l(\vartheta, \varphi)$ based on $\hat{\tau}(\vartheta, \varphi)$.

A18. The method of claim A17, wherein filtering the audio signal using the right filter comprises filtering the audio signal using the right filter and the right delay $\hat{\tau}_r(\vartheta, \varphi)$; and filtering the audio signal using the left filter comprises filtering the audio signal using the left filter and the left delay $\hat{\tau}_l(\vartheta, \varphi)$.

A19. The method of claim A18, wherein filtering the audio signal using the right filter and $\hat{\tau}_r(\vartheta, \varphi)$ comprises calculating: $\hat{h}^r(\vartheta, \varphi)*u(n-\hat{\tau}_r(\vartheta, \varphi))$, filtering the audio signal using the left filter and $\hat{\tau}_l(\vartheta, \varphi)$ comprises calculating: $\hat{h}^l(\vartheta, \varphi)*u(n-\hat{\tau}_l(\vartheta, \varphi))$, where u(n) is the audio signal.

A20. The method of any one of claims A17-A19, wherein $$\hat{\tau}_r(\vartheta, \varphi) = \begin{cases} 0 & \hat{\tau}(\vartheta', \varphi') \leq 0 \\ \hat{\tau}(\vartheta', \varphi') & \hat{\tau}(\vartheta', \varphi') > 0 \end{cases}; \text{ and}$$

$$\hat{\tau}_l(\vartheta, \varphi) = \begin{cases} |\hat{\tau}(\vartheta', \varphi')| & \hat{\tau}(\vartheta', \varphi') < 0 \\ 0 & \hat{\tau}(\vartheta', \varphi') \geq 0 \end{cases}.$$

A21. The method of any one of claims A7-A15, wherein the azimuth basis functions are periodic with a period of 360 degrees.

While various embodiments are described herein (including the Appendices, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

AR Augmented Reality
DOA Direction of Arrival
FIR Finite Impulse Response
HR Head-Related
HRIR Head-Related Impulse Response
HRTF Head-Related Transfer Function
ILD Interaural Level Difference
IPD Interaural Phase Difference
ITD Interaural Time Difference
ITF Interaural Transfer Function
MAA Minimum Audible Angle
MPEG Moving Picture Experts Group
MR Mixed Reality
MSE Mean Squared Error
PCA Principal Component Analysis
SAOC Spatial Audio Object Coding
SH Spherical Harmonic
SOFA Spatially Oriented Format for Acoustics
SVD Singular Value Decomposition
VR Virtual Reality
XR Extended Reality

REFERENCES

[1] Dons J. Kistler, Frederic L. Wightman, "A model of head-related transfer functions based on principal components analysis and minimum-phase reconstruction", Journal of the Acoustical Society of America, 91(3):1637-1647, March 1992.

[2] Fábio P. Freeland, Luiz W. P. Biscainho and Paulo S. R. Diniz, "Interpolation of Head-Related Transfer Functions (HRTFS): A multi-source approach," in 12th European Signal Processing Conference, pp. 1761-1764, Vienna, September 2004.

[3] Mengqiu Zhang, Rodney A. Kennedy, and Thushara D. Abhayapala, "Empirical determination of frequency representation in spherical harmonics-based HRTF functional modeling", IEEE/ACM Transactions on Audio, Speech, and Language Processing, vol. 23 (2), pp. 351-360, February 2015.

[4] Zamir Ben-Hur, David Lou Alon, Boaz Rafaely, and Ravish Mehra, "Loudness stability of binaural sound with spherical harmonic representation of sparse head-related transfer functions", EURASIP Journal on Audio, Speech, and Music Processing 2019: 5, 2019.

The invention claimed is:

1. A method for generating a data sequence at an elevation angle $\vartheta$ and an azimuth angle $\varphi$, the method comprising:

obtaining a first set of azimuth basis function values for the azimuth angle, wherein obtaining the first set of azimuth basis function values comprises: for each azimuth basis function included in a first set of azimuth basis functions, evaluating the azimuth basis function at the azimuth angle to produce an azimuth basis function value corresponding to the azimuth angle and the azimuth basis function, and further wherein each of the azimuth basis functions included in the first set of azimuth basis functions is a periodic basis function; and using the first set of azimuth basis function values to generate the data sequence at the elevation angle and azimuth angle.

2. The method of claim 1, wherein obtaining the first set of azimuth basis function values comprises obtaining P sets of azimuth basis function values for the azimuth angle, wherein the P sets of azimuth basis function values comprises the first set of azimuth basis function values.

3. The method of claim 1, wherein each said azimuth basis function value is dependent on the elevation angle.

4. The method of claim 2, wherein generating the data sequence comprises calculating it in an elevation anchored expansion form:

$$\sum_{p=1}^{P}\sum_{q=1}^{Q_p}\sum_{k=1}^{K}\alpha_{p,q,k}\Theta_p(\vartheta)\Phi_{p,q}(\varphi)e_k,$$

where $\alpha_{p,q,k}$ for p=1 to P, q=1 to $Q_p$, and k=1 to K is a set of model parameters;

$\Theta_p(\vartheta)$ for p=1 to P defines a first set of elevation basis function values for the elevation angle $\vartheta$;

$\Phi_{p,q}(\varphi)$ for p=1 to P and q=1 to $Q_p$ defines the P sets of azimuth basis function values for the azimuth angle $\varphi$;

$e_k$ for k=1 to K is a set of canonical orthonormal basis vectors of length N;

P is the number of elevation basis function values;

$Q_p$ is the number of azimuth basis function values used in conjunction with the p-th elevation basis function value;

K is the number of canonical orthonormal basis vectors, where K≤N; and

N is the length of the generated data sequence.

5. The method of claim 1, wherein generating the data sequence comprises calculating it in an azimuth anchored expansion form:

$$\sum_{q=1}^{Q}\sum_{p=1}^{P_q}\sum_{k=1}^{K}\alpha_{p,q,k}\Theta_{q,p}(\vartheta)\Phi_q(\varphi)e_k,$$

where $\alpha_{p,q,k}$ for q=1 to Q, p=1 to $P_q$, and k=1 to K is a set of model parameters, $\Theta_{q,p}(\vartheta)$ for q=1 to Q and p=1 to $P_q$ defines Q sets of elevation basis function values for the elevation angle $\vartheta$, and $\Phi_q(\varphi)$ for q=1 to Q defines the first set of azimuth basis function values for the azimuth angle $\varphi$;

$e_k$ for k=1 to K is a set of canonical orthonormal basis vectors of length N;

Q is the number of azimuth basis function values;

$P_q$ is the number of elevation basis function values used in conjunction with the q-th azimuth basis function value;

K is the number of canonical orthonormal basis vectors, where K≤N; and

N is the length of the generated data sequence.

6. The method of claim 1, further comprising obtaining a representation that represents the first set of azimuth basis functions, wherein the representation comprises:

a sequence ($\phi_1$), where $\phi_1=(\phi_{1,1}, \ldots, \phi_{1,L_1})$, that specifies sub-intervals $\{\phi_{1,l}\leq\varphi\leq\phi_{1,l+1}: l=1, \ldots, L_1-1\}$ over which the azimuth basis functions are polynomials, and a three-dimensional array of power coefficients ($\gamma_1^\Phi=\{\gamma_{1,j,l,q}^\Phi: j=0 \ldots, J-1; l=1, \ldots, L_1-1; q=1, \ldots, Q_1\}$) that describe the polynomials as linear combinations of the powers of the azimuth angle.

7. The method of claim 6, wherein the first set of azimuth basis functions comprises a qth azimuth basis function, evaluating each azimuth basis function included in the first set of azimuth basis functions at the azimuth angle $\varphi$ comprises evaluating the qth azimuth basis function at the azimuth angle $\varphi$, and evaluating the qth azimuth basis function at the azimuth angle $\varphi$ comprises the following steps:

finding an index l for which $\phi_{1,l}\leq\varphi\leq\phi_{1,l+1}$; and evaluating the value of the qth azimuth basis function at the azimuth angle ($\varphi$) as $\Phi_{1,q}(\varphi)=\Sigma_{j=0}^{J-1}\gamma_{1,j,l,q}^\Phi\varphi^j$.

8. The method of claim 1, wherein the step of obtaining the first set of azimuth basis function values further comprises generating the first set of azimuth basis functions.

9. The method of claim 8, wherein generating the first set of azimuth basis functions comprises generating a set of periodic B-spline basis functions over an azimuth range 0 to 360 degrees.

10. The method of claim 9, wherein generating the set of periodic B-spline basis functions over an azimuth range 0 to 360 degrees comprises:

specifying a knot sequence of length L over a range 0 to 360 degrees;

generating an extended knot sequence based on the knot sequence of length L, wherein generating the extended knot sequence comprises extending the knot sequence of length L in a periodic manner with J values below 0 degrees and J−1 values above 360 degrees;

obtaining an extended multiplicity sequence of ones;

using the extended knot sequence and the extended multiplicity sequence to generate a set of extended B-spline basis functions;

choosing the L−1 consecutive of those extended basis functions starting at index 2; and mapping the chosen extended basis functions in a periodic fashion to the azimuth range of 0 to 360 degrees.

11. The method of claim 1, wherein the azimuth basis functions are periodic with a period of 360 degrees.

12. The method of claim 1, wherein each of the azimuth basis functions included in the first set of azimuth basis functions is a periodic B-spline basis function.

13. The method of claim 4, wherein a transform T is done on the $e_k$ vectors.

14. The method of claim 5, wherein a transform T is done on the $e_k$ vectors.

15. The method of claim 1, wherein generating the data sequence comprises calculating it in an expansion form:

$$\sum_{q=1}^{Q}\sum_{p=1}^{P}\sum_{k=1}^{K}\alpha_{p,q,k}\Theta_p(\vartheta)\Phi_q(\varphi)e_k$$

where $\alpha_{p,q,k}$ for q=1 to Q, p=1 to P, and k=1 to K is a set of model parameters;

$\Theta_p(\vartheta)$ for p=1 to P defines the first set of elevation basis function values for the elevation angle $\vartheta$;

$\Phi_q(\varphi)$ for q=1 to Q defines the first set of azimuth basis function values for the azimuth angle $\varphi$;

$e_k$ for k=1 to K is a set of canonical orthonormal basis vectors of length N;

Q is the number of azimuth basis function values;

P is the number of elevation basis function values;

K is the number of canonical orthonormal basis vectors, where K≤N; and

N is the length of the generated data sequence.

16. A method for generating a model for modeling a set of data sequences sampled over a set of elevation angles and azimuth angles, the method comprising:

specifying an azimuth basis function, where the azimuth basis function is a periodic basis function; and determining a set of model parameters for the model using the azimuth basis function.

17. The method of claim 16, wherein the model is defined in an elevation anchored expansion as:

$$\sum_{p=1}^{P}\sum_{q=1}^{Q_p}\sum_{k=1}^{K}\alpha_{p,q,k}\Theta_p(\vartheta)\Phi_{p,q}(\varphi)e_k,$$

where $\alpha_{p,q,k}$ for p=1 to P, q=1 to $Q_p$, and k=1 to K is the set of model parameters;

$\Theta_p(\vartheta)$ for p=1 to P defines a first set of elevation basis function values for an elevation angle $\vartheta$;

$\Phi_{p,q}(\varphi)$ for p=1 to P and q=1 to $Q_p$ defines P sets of azimuth basis function values for an azimuth angle $\varphi$;

$e_k$ for k=1 to K is a set of canonical orthonormal basis vectors of length N;

P is the number of elevation basis function values;

$Q_p$ is the number of azimuth basis function values used in conjunction with the p-th elevation basis function value;

K is the number of canonical orthonormal basis vectors, where K≤N; and

N is the length of the generated data sequence.

18. The method of claim 16, wherein the model is defined in an azimuth anchored expansion as:

$$\sum_{q=1}^{Q}\sum_{p=1}^{P_q}\sum_{k=1}^{K}\alpha_{p,q,k}\Theta_{q,p}(\vartheta)\Phi_q(\varphi)e_k,$$

where $\alpha_{p,q,k}$ for q=1 to Q, p=1 to $P_q$, and k=1 to K is the set of model parameters;

$\Theta_{q,p}(\vartheta)$ for q=1 to Q and p=1 to $P_q$ defines Q sets of elevation basis function values for an elevation angle $\vartheta$;

$\Phi_q(\varphi)$ for q=1 to Q defines the first set of azimuth basis function values for an azimuth angle $\varphi$;

$e_k$ for k=1 to K is a set of canonical orthonormal basis vectors of length N;

Q is the number of azimuth basis function values;

$P_q$ is the number of elevation basis function values used in conjunction with the q-th azimuth basis function value;

K is the number of canonical orthonormal basis vectors, where K≤N; and

N is the length of the generated data sequences.

19. The method of claim 16, wherein the model is defined in an expansion form:

$$\sum_{q=1}^{Q}\sum_{p=1}^{P}\sum_{k=1}^{K}\alpha_{p,q,k}\Theta_p(\vartheta)\Phi_q(\varphi)e_k$$

where $\alpha_{p,q,k}$ for q=1 to Q, p=1 to P, and k=1 to K is the set of model parameters;

$\Theta_p(\vartheta)$ for p=1 to P defines the first set of elevation basis function values for an elevation angle $\vartheta$;

$\Phi_q(\varphi)$ for q=1 to Q defines the first set of azimuth basis function values for an azimuth angle $\varphi$;

$e_k$ for k=1 to K is a set of canonical orthonormal basis vectors of length N;

Q is the number of azimuth basis function values;

P is the number of elevation basis function values;

K is the number of canonical orthonormal basis vectors, where K≤N; and

N is the length of the generated data sequences.

20. The method of claim 16, wherein the azimuth basis function is a periodic B-spline basis function.

21. A non-transitory computer readable medium storing a computer program comprising instructions which when executed by processing circuitry of an apparatus causes the apparatus to perform the method of claim 1.

22. A non-transitory computer readable medium storing a computer program comprising instructions which when executed by processing circuitry of an apparatus causes the apparatus to perform the method of claim 16.

23. An apparatus, the apparatus comprising:

processing circuitry; and a memory, the memory containing instructions executable by the processing circuitry, wherein the apparatus is configured to perform the method of claim 1.

24. An apparatus, the apparatus comprising:

processing circuitry; and a memory, the memory containing instructions executable by the processing circuitry, wherein the apparatus is configured to perform the method of claim 16.

25. The method of claim 16, wherein the azimuth basis function is periodic with a period of 360 degrees.

* * * * *